(12) United States Patent
Son et al.

(10) Patent No.: US 10,187,852 B2
(45) Date of Patent: Jan. 22, 2019

(54) METHOD AND APPARATUS FOR SUPPORTING IDLE MODE IN MOBILE COMMUNICATION SYSTEM

(71) Applicant: Samsung Electronics Co., Ltd., Suwon-si, Gyeonggi-do (KR)

(72) Inventors: Yeongmoon Son, Yongin-si (KR); Ki-Suk Kweon, Suwon-si (KR); Jung-Shin Park, Seoul (KR); Antony Franklin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/466,144

(22) Filed: Mar. 22, 2017

(65) Prior Publication Data

US 2017/0195960 A1 Jul. 6, 2017

Related U.S. Application Data

(63) Continuation of application No. 14/619,349, filed on Feb. 11, 2015.

(30) Foreign Application Priority Data

Feb. 12, 2014 (KR) ........................ 10-2014-0015937

(51) Int. Cl.
*H04W 52/02* (2009.01)
*H04W 68/00* (2009.01)
*H04W 76/12* (2018.01)

(52) U.S. Cl.
CPC ... *H04W 52/0225* (2013.01); *H04W 52/0216* (2013.01); *H04W 52/0229* (2013.01); *H04W 68/005* (2013.01); *H04W 76/12* (2018.02); *Y02D 70/1262* (2018.01); *Y02D 70/142* (2018.01); *Y02D 70/146* (2018.01); *Y02D 70/21* (2018.01)

(58) Field of Classification Search
None
See application file for complete search history.

(56) References Cited

U.S. PATENT DOCUMENTS

| 9,648,489 | B2 | 5/2017 | Touray et al. | |
|---|---|---|---|---|
| 2006/0025134 | A1 | 2/2006 | Cho et al. | |
| 2006/0194581 | A1 | 8/2006 | Kang et al. | |
| 2006/0251058 | A1 | 11/2006 | Xu et al. | |
| 2007/0086395 | A1* | 4/2007 | Bakshi | H04W 68/02 370/338 |
| 2007/0087767 | A1 | 4/2007 | Pareek et al. | |
| 2007/0105600 | A1* | 5/2007 | Mohanty | H04W 68/00 455/574 |
| 2008/0045178 | A1 | 2/2008 | Venkatachalam | |

(Continued)

*Primary Examiner* — Andrew C Oh
(74) *Attorney, Agent, or Firm* — Jefferson IP Law, LLP

(57) ABSTRACT

A method of a base station (BS) in a mobile communication system to support an idle mode in a wireless communication system is provided. The method includes performing a negotiation procedure for idle mode entry of a mobile station (MS), with the MS, determining whether to operate as a paging controller for the idle mode MS, detecting a packet destined for the MS, and transmitting a message notifying existence of the packet destined for the MS, to at least one other BS in a paging zone of the BS.

6 Claims, 21 Drawing Sheets

(56) References Cited

U.S. PATENT DOCUMENTS

| | | | |
|---|---|---|---|
| 2008/0095088 A1* | 4/2008 | Ryu | H04W 36/0011 |
| | | | 370/311 |
| 2008/0139206 A1* | 6/2008 | Touray | H04W 8/18 |
| | | | 455/437 |
| 2008/0200188 A1* | 8/2008 | Rajahalme | H04W 68/00 |
| | | | 455/458 |
| 2008/0259889 A1 | 10/2008 | Wu | |
| 2008/0320149 A1 | 12/2008 | Faccin | |
| 2009/0003285 A1 | 1/2009 | Mohanty et al. | |
| 2009/0046637 A1* | 2/2009 | Kim | H04W 72/005 |
| | | | 370/329 |
| 2009/0201852 A1 | 8/2009 | Chen | |
| 2009/0290556 A1 | 11/2009 | Taaghol | |
| 2009/0298516 A1 | 12/2009 | Ryu et al. | |
| 2010/0002652 A1* | 1/2010 | Kawakami | H04W 36/0011 |
| | | | 370/331 |
| 2010/0004002 A1 | 1/2010 | Hahn et al. | |
| 2010/0069041 A1* | 3/2010 | Wang | H04W 68/02 |
| | | | 455/411 |
| 2010/0118755 A1 | 5/2010 | Lin et al. | |
| 2010/0167756 A1 | 7/2010 | Park et al. | |
| 2010/0273512 A1* | 10/2010 | Wang | H04W 68/06 |
| | | | 455/458 |
| 2011/0065467 A1 | 3/2011 | Park et al. | |
| 2011/0201354 A1* | 8/2011 | Park | H04W 68/04 |
| | | | 455/456.1 |
| 2011/0213820 A1 | 9/2011 | Morris | |
| 2011/0238834 A1* | 9/2011 | Nair | H04W 36/0033 |
| | | | 709/225 |
| 2011/0312338 A1 | 12/2011 | Park et al. | |
| 2012/0142371 A1 | 6/2012 | Park et al. | |
| 2014/0023040 A1* | 1/2014 | Son | H04W 36/023 |
| | | | 370/331 |

\* cited by examiner

METHOD AND APPARATUS FOR SUPPORTING IDLE MODE IN MOBILE COMMUNICATION SYSTEM

CROSS-REFERENCE TO RELATED APPLICATION(S)

This application is a continuation application of prior application Ser. No. 14/619,349, filed on Feb. 11, 2015, which claimed the benefit under 35 U.S.C. § 119(a) of a Korean patent application filed on Feb. 12, 2014 in the Korean Intellectual Property Office and assigned Serial number 10-2014-0015937, the entire disclosure of which is hereby incorporated by reference.

TECHNICAL FIELD

The present disclosure relates to a mobile communication system. More particularly, the present disclosure relates to a method and an apparatus for supporting an idle mode in a flat network communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands (e.g., 60 GHz bands), so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

When there is no data to transmit and receive during a certain time in a $4^{th}$ Generation (4G) communication system, a mobile station (MS) enters an idle mode to minimize power consumption.

Typically, a $3^{rd}$ Generation Partnership Project (3GPP) communication system according to the related art or a World Interoperability for Microwave Access (WiMAX) communication system includes a separate entity for managing the idle mode of the MS. That is, a paging controller (PC) of the WiMAX system manages the idle mode of the MS, and a mobility management entity (MME) of the 3GPP system manages the idle mode of the MS.

When a packet destined for the idle mode MS is received from Internet in the WiMAX system, an access service network gateway (ASN-GW) informs the PC of the received packet destined for the idle mode MS.

The PC transmits paging announce messages to all of the Base Stations (BSs) in a paging zone of the MS, and the BSs transmit an MOB PAG-ADV message through an air interface. When a packet arrives at a serving gateway (S-GW) via a public data network (PDN) gateway (P-GW) in the 3GPP system, the S-GW informs the MME of the packet reception, and the MME transmits a paging message to every BS in a tracking area of the MS. The BS receiving the paging message broadcasts the received paging message.

The PC or the MME is aware of the BSs in the corresponding paging zone or the corresponding tracking area.

When receiving data of the idle mode MS in the WiMAX system and the 3GPP system, the gateway for managing data notifies the received data to the entity for managing the idle mode. The entity transmits a paging signal to BSs in the paging zone of the idle mode MS.

A $5^{th}$ Generation (5G) communication system requires a high bandwidth to support a high data rate. To this end, a super high frequency band (>30 GHz) is under consideration. However, since the super high frequency band is subject to high path loss, BS coverage reduction is inevitable.

Thus, the 5G communication system considers a small BS or a small cell, and manages macro BS coverage according to the related art using a plurality of small BSs. In this case, the gateway is subject to a considerable load.

That is, since a backhaul data rate of one small BS is high and the number of small BSs connected to the gateway exponentially increases in the 5G communication system, the throughput of the gateway needs to increase tens to hundreds of times. In addition, when the gateway does not normally operate, all of the small BSs of the gateway may not operate normally.

To address such drawbacks, the communication system connects the small BSs directly to Internet, rather than connecting the small BSs to the gateway. Such a communication system is referred to as a flat network communication system.

Since the flat network communication system is different from the communication system in the structure according to the related art, an entity for controlling the paging differently from the PC and MME according to the related art is required.

In this regard, what are needed are a method and an apparatus for efficiently supporting the idle mode in the flat network communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for efficiently supporting an idle mode in a mobile communication system.

Another aspect of the present disclosure is to provide a method and an apparatus for efficiently supporting an idle mode in a flat network communication system.

Another aspect of the present disclosure is to provide a method and an apparatus for efficiently supporting an idle mode when a flat network system includes no paging controller (PC) according to the related art.

Another aspect of the present disclosure is to provide a method and an apparatus for efficiently supporting an idle mode when a PC cannot be changed in a flat network system.

Another aspect of the present disclosure is to provide a method and an apparatus for efficiently supporting an idle mode when a PC may be changed in a flat network system.

In accordance with an aspect of the present disclosure, a method of a base station (BS) in a mobile communication system is provided. The method includes performing a negotiation procedure for idle mode entry of a mobile station (MS), with the MS, determining whether to operate as a PC for the idle mode MS, detecting a packet destined for the idle mode MS, and transmitting a message notifying the packet destined for the idle mode MS, to at least one other BS in a paging zone of the BS.

In accordance with another aspect of the present disclosure, a method of a BS in a mobile communication system is provided. The method includes receiving a message notifying a packet destined for an MS, from another BS in a paging zone of the BS, broadcasting a paging advertisement message notifying the packet destined for the MS, obtaining information about the other BS operating as a PC of the MS by performing a network reentry procedure with the MS, receiving the packet destined for the MS from the other BS operating as the PC of the MS, and transmitting the received packet to the MS.

In accordance with another aspect of the present disclosure, a method of a BS in a mobile communication system is provided. The method includes receiving information about another BS operating as a PC of an MS by performing a location update procedure with the MS, determining whether to operate as a new PC of the MS, and transmitting a message notifying that the BS operates as the new PC, to the other BS.

In accordance with another aspect of the present disclosure, a method of an MS in a mobile communication system is provided. The method includes entering an idle mode by negotiating idle mode entry with a first BS, determining the first BS as a PC, receiving an advertisement message from a second BS, based on the received advertisement message, determining, based on the received advertisement message, whether the MS is in a paging zone of the first BS, and performing, if the MS is in the paging zone of the first BS, a network reentry procedure with the second BS.

In accordance with another aspect of the present disclosure, an apparatus of a BS in a mobile communication system is provided. The apparatus includes at least one transceiver configured to transmit and receive signals to and from an MS, and to transmit and receive signals to and from another BS, and at least one processor configured to perform a negotiation procedure for idle mode entry of the MS, with the MS, to determine whether to operate as a PC for the mode in the idle mode, to detect a packet destined for the MS, and to transmit a message notifying the packet destined for the MS, to at least one other BS in a paging zone of the BS.

In accordance with another aspect of the present disclosure, an apparatus of a BS in a mobile communication system is provided. The apparatus includes at least one transceiver configured to transmit and receive signals to and from an MS, and to transmit and receive signals to and from another BS, and at least one processor configured to receive a message notifying a packet destined for an MS, from the other BS in a paging zone of the BS, to broadcast a paging advertisement message notifying the packet destined for the MS, to obtain information of the other BS operating as a PC of the MS by performing a network reentry procedure with the MS, to receive the packet destined for the MS from the other BS operating as the PC of the MS, and to transmit the received packet to the MS.

In accordance with another aspect of the present disclosure, an apparatus of a BS in a mobile communication system is provided. The apparatus includes at least one transceiver configured to transmit and receive signals to and from an MS, and to transmit and receive signals to and from another BS, and at least one processor configured to receive information about the other BS operating as a PC of the MS by performing a location update procedure with the MS, to determine whether to operate as a new PC of the MS, and to transmit a message notifying that the BS operates as the new PC, to the other BS.

In accordance with another aspect of the present disclosure, an apparatus of an MS in a mobile communication system is provided. The apparatus includes at least one transceiver configured to transmit and receive signals to and from a BS and at least one processor configured to enter an idle mode by negotiating idle mode entry with a first BS, to determine the first BS as a PC, to receive an advertisement message from a second BS, to determine based on the received advertisement message whether the MS is in a paging zone of the first BS, and to perform, if the MS is in the paging zone of the first BS, a network reentry procedure with the second BS.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. The description includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure provide a method and an apparatus for supporting an idle mode in a mobile communication system, particularly, in a flat network communication system. Hereinafter, a base station (BS) indicates a small BS.

Figure 1A:
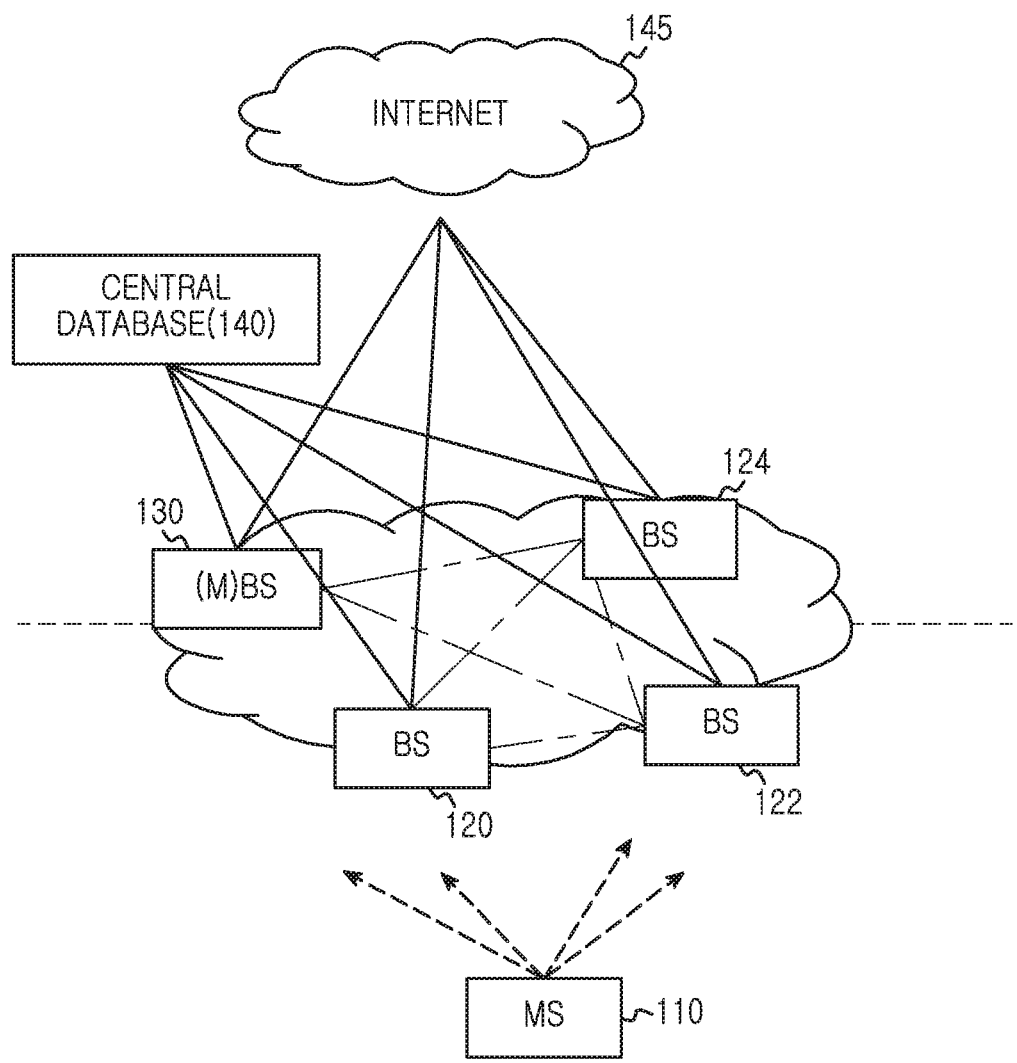
FIG. 1A is a simplified diagram of a flat network communication system according to an embodiment of the present disclosure.

FIG. 1A is a simplified diagram of a flat network communication system according to an embodiment of the present disclosure.

Referring to FIG. 1A, there is no separate entity for managing an idle mode of a mobile station (MS) 110.

Instead, the BS operates as a paging controller (PC) of the MS 110. For example, a BS of the MS 110 successfully negotiating the idle mode operates as the PC of the MS 110.

One of BSs 120, 122, 124 and 130 may operate as the PC. The BSs 120, 122, 124 and 130 are connected directly to Internet 145.

It is assumed that the BSs 120, 122, 124 and 130 are aware of their paging zone through preset configuration or communication with a central database 140.

Also, it is assumed that the BSs 120, 122, 124 and 130 hold a list of BSs in the paging zone. The BSs 120, 122, 124 and 130 broadcast their paging zone information. A master BS 130 of the BSs 120, 122, 124 and 130 may operate as a data anchor for an open system interface (OSI) layer 3 when the MS 110 migrates between the BSs 120, 122, 124 and 130.

Figure 1B:
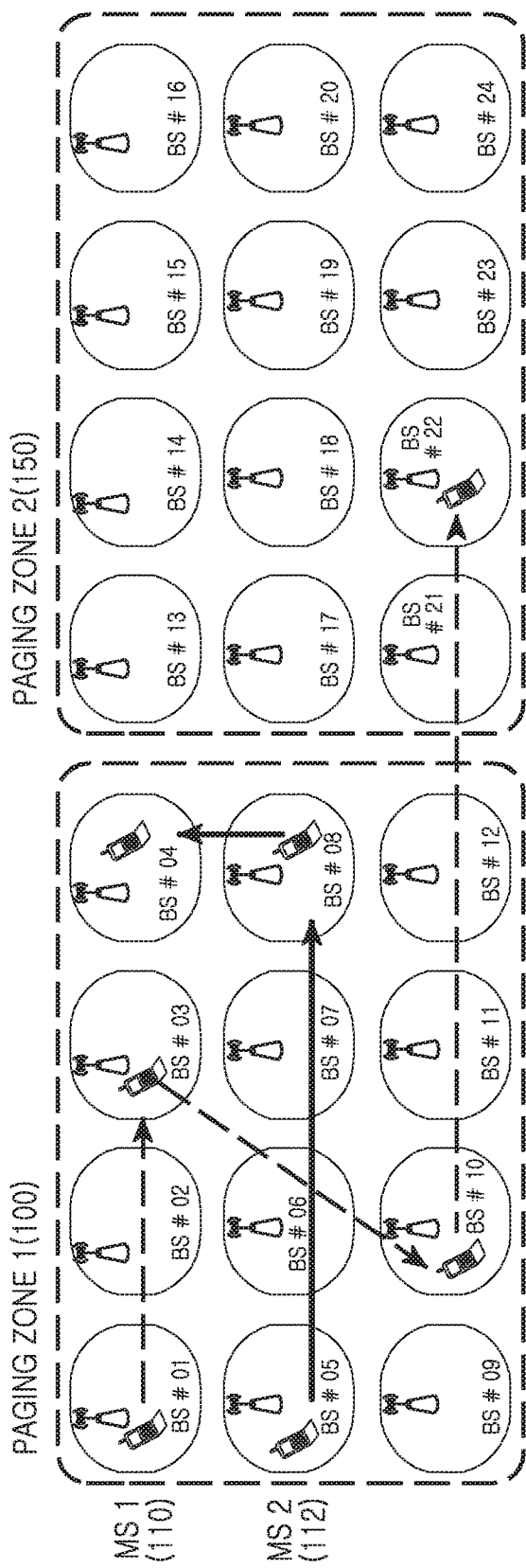
FIG. 1B is a diagram of paging controller (PC) change in a flat network communication system according to an embodiment of the present disclosure.

FIG. 1B is a diagram of a PC change in a flat network communication system according to an embodiment of the present disclosure.

Referring to FIG. 1B, a BS#01 through a BS#12 reside in a first paging zone 100, and a BS#13 through a BS#24 reside in a second paging zone 150. Each BS has a list of BSs in the BS' paging zone and a list of BSs in the other paging zone.

An MS1 110 migrates from the BS#01 to the BS#03 and from the BS#03 to the BS#10 in a connection (or active) mode. Herein, when the MS1 110 migrates between the BSs, handover is performed. The MS1 110 enters an idle mode by negotiating signaling with the BS#10. Next, the BS#10 operates as a PC of the MS1 110. Next, the MS1 110 in the idle mode migrates to the BS#22 of the second paging zone 150.

Similarly, an MS2 112 migrates from the BS#05 to the BS#08 in the connection (or active) mode. Herein, the handover is performed between the BSs. The MS2 112 enters the idle mode by negotiating the signaling with the BS#8. Next, the MS2 112 in the idle mode migrates to the BS#04.

Next, the MS1 110 migrates to the BS#22 of the second paging zone 150 over the first paging zone 100. Since the MS1 110 recognizes the MS' location in the second paging zone 150 based on information broadcast by the BS#22, the MS1 110 performs location update or zone-based location update in the idle mode.

Since the MS2 112 stays in the same paging zone 100 even after the migration, the location update for the paging zone change is unnecessary.

Figure 2:
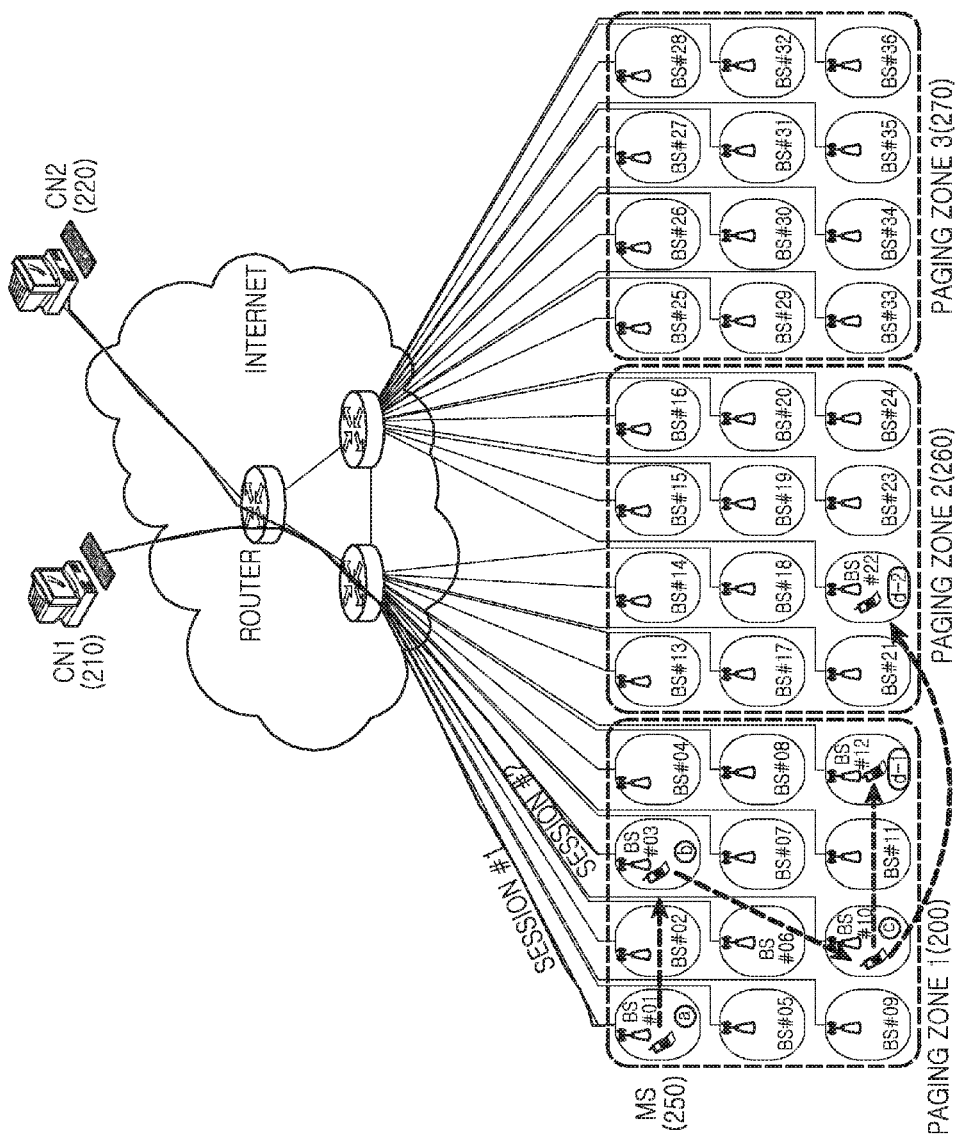
FIG. 2 is another diagram of a PC change in a flat network communication system according to an embodiment of the present disclosure.

FIG. 2 is another diagram of a PC change in a flat network communication system according to an embodiment of the present disclosure.

Referring to FIG. 2, a BS#01 through a BS#12 reside in a first paging zone 200, and a BS#13 through a BS#24 reside in a second paging zone 260. A BS#25 through a BS#36 reside in a third paging zone 270. Each BS has a list of BSs in the BS' paging zone and a list of BSs in the other paging zones.

An MS 250 has a session (e.g., a Transmission Control Protocol (TCP) session) generated by communicating with a first Corresponding Node (CN) 210 via the BS#1 in the connection (or active) mode in operation a, and has a session generated by communicating with a CN2 220 via the BS#3 in operation b. Herein, when the MS 250 migrates between the BSs, the handover is performed. The MS 250 enters the idle mode by negotiating the signaling with the BS#10 in operation c. In so doing, the BS#10 may commence the paging control function of the MS 250.

Next, when the MS 250 migrates to the BS#12 of the first paging zone 200, the paging zone is not changed and accordingly the location update is unnecessary in operation d-1.

However, when migrating to the BS#22 of the second paging zone 260, the MS 250 may recognize the MS' location in the second paging zone 260 based on the information broadcast by the BS#22 and update the location in the idle mode in operation d-2. Alternatively, when not receiving the broadcast information including the paging zone information at a preset interval, the MS 250 may update the location in the idle mode.

At every migration to another BS, the MS 250 is allocated a new internet protocol (IP) address from the corresponding BS. In this case, since the packet in the session generated with the IP address allocated from the previous BS is sent to the previous BS, the MS 250 cannot receive such a packet. To address this shortcoming, mobile IP technology is used.

Figure 3:
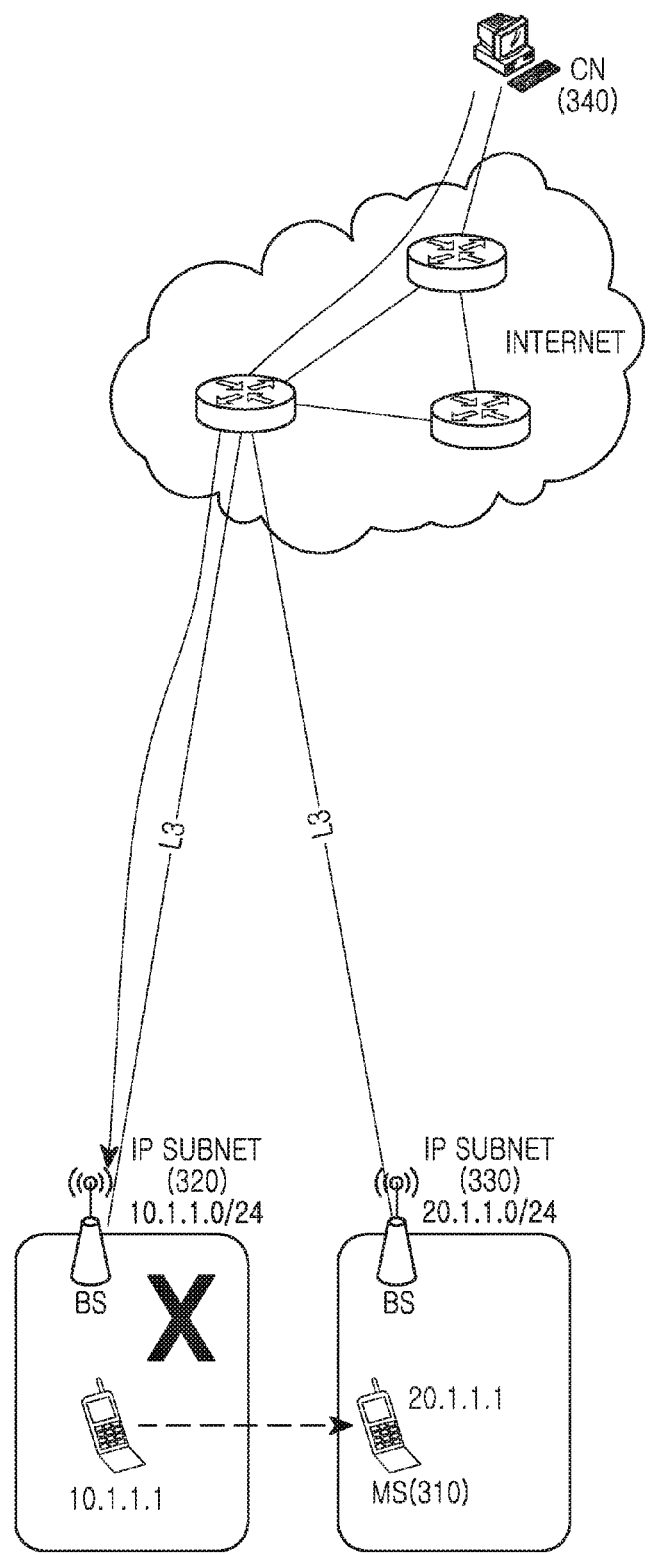
FIG. 3 is a diagram of mobile internet protocol (IP) operations according to an embodiment of the present disclosure.

FIG. 3 depicts mobile IP operations according to an embodiment of the present disclosure.

Referring to FIG. 3, an MS 310 establishes a session by communicating with a CN 340 via a BS having an IP subnet 320 of 10.1.1.0/24. Next, the MS 310 migrates to a BS having an IP subnet 330 of 20.1.1.0/24.

When migrating from the IP subnet 320 to the IP subject 330, the MS 310 is allocated a new IP address 20.1.1.1 from the corresponding BS.

When the mobile IP is not valid and the BS having the IP subnet 320 of 10.1.1.0/24 receives a packet destined for the MS 310 from the CN 340, the MS 310 cannot receive the packet because the MS 310 has already migrated to the IP subnet 330 of 20.1.1.0/24.

When the mobile IP is valid, the BS having the IP subject 330 of 20.1.1.0/24 builds a tunnel for the session between the CN 340 and the MS 310, between the BSs by performing a binding update procedure with the BS having the IP subnet 320 of 10.1.1.0/24.

When the BS having the IP subnet 320 of 10.1.1.0/24 receives a packet destined for the MS 310 from the CN 340, that is, when the BS receives the packet over the session, the BS having the IP subnet 320 of 10.1.1.0/24 may forward the packet to the BS having the IP subject 330 of 20.1.1.0/24 through the generated tunnel and the MS 310 may receive the packet via the BS having the IP subject 330 of 20.1.1.0/24.

For doing so, each BS needs to serve as a home agent of the mobile IP, and to serve as a foreign agent of the mobile IP for the MS migrated to the other BS.

In this case, the packet sent to the previous BS (the home agent) in the previous session may be forwarded to the corresponding MS through the tunnel generated through the binding update procedure between the new BS (the foreign agent) and the previous BS.

Now, a case where the last BS of the idle mode MS operates as the PC is explained.

Figure 4:
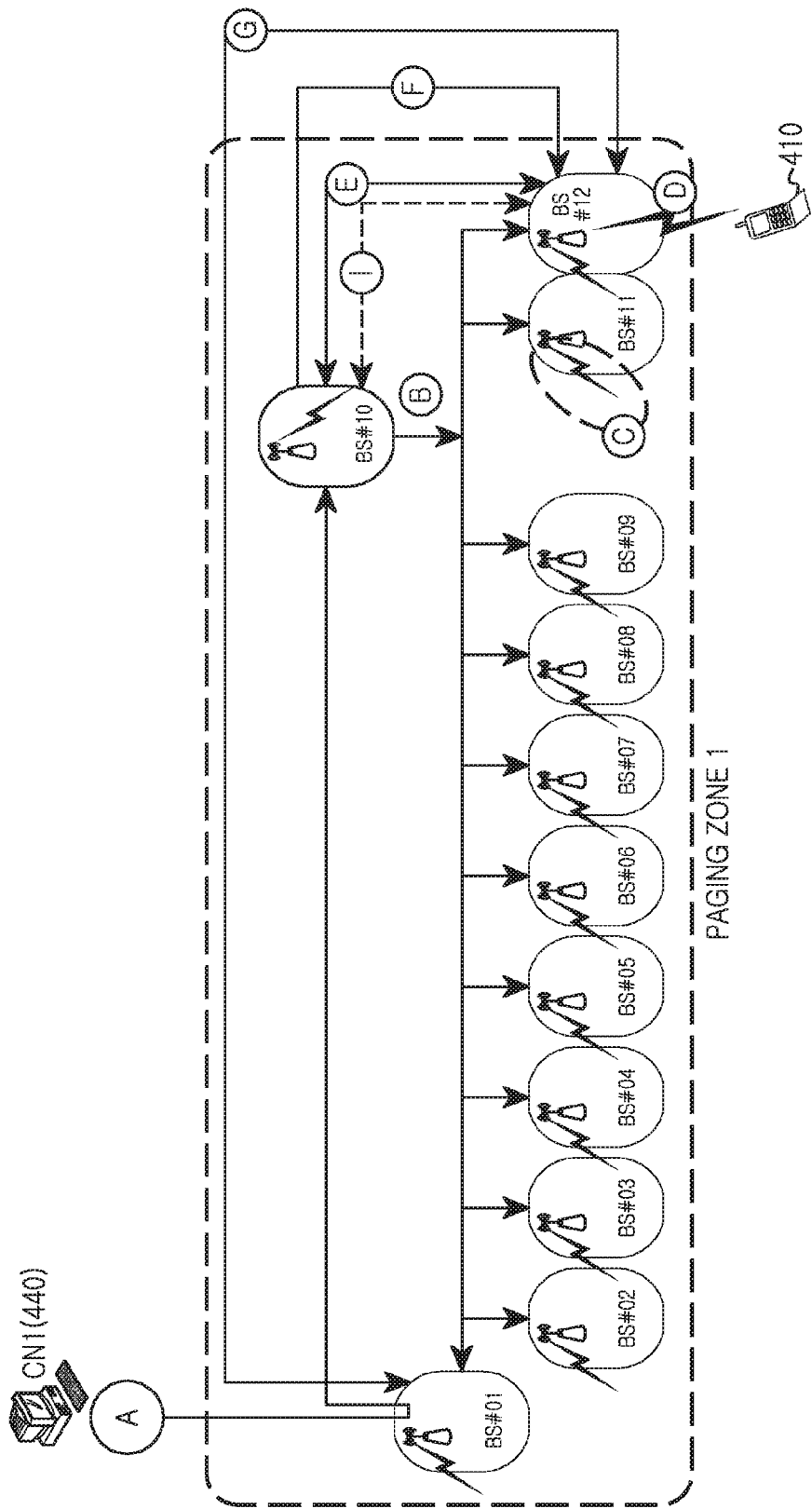
FIG. 4 is a diagram of paging when a packet for an idle mode Mobile Station (MS) is received at a base station (BS) according to an embodiment of the present disclosure.

FIG. 4 depicts paging when a packet destined for an idle mode MS is received at a BS according to an embodiment of the present disclosure.

Referring to FIG. 4, an MS 410 establishes the session with a CN1 440 by communicating via the BS#01, and migrates to the BS#10 while transmitting and receiving packets to and from the CN1 440 in the session. In so doing, the binding update procedure is performed between the BS#10 and the BS#01 and thus a first tunnel is created.

When the MS 410 travels near the BS#10, the packet arriving at the BS#01 from the CN1 440 is forwarded to the BS#10 through the first tunnel in operation A. Next, the MS 410 enters the idle mode around the BS#10 and thus the BS#10 becomes the PC of the MS 410. The MS 410 and the BS#10 may recognize that the BS#10 is the PC of the MS 410.

In so doing, the BS#01 does not know and does not need to know that the BS#10 is the PC of the MS 410. The BS#01 only needs to forward the received packet through the generated first tunnel.

When the received packet is destined for the MS 410 in the idle mode, the BS#10 receiving the packet from the BS#01 transmits a paging announce message to the other BSs (to some or all of the BSs for sequential paging) in the paging zone of the BS#10 in operation B. The other BSs receiving the paging announce message generate and broadcast a paging advertisement message indicating the received packet destined for the MS 410 in operation C.

The MS 410 receives the paging advertisement message via the BS#12 and then performs a network reentry procedure with the BS#12. In so doing, the MS 410 informs the BS#12 of the BS being the MS 410's PC and the MS 410's home address. Such information is included in the message of the network reentry procedure in operation D. In this case, the BS#12 becomes a new serving BS for the MS 410.

After completing the reentry, the BS#12 may inform the BS#10 being the PC of the MS 410, of the MS 410 reentry, and receive, if necessary, context of the MS 410 from the BS#10 being the PC of the MS 410 in operation E. The context of the MS 410 may include the home address and the session information of the MS 410.

Next, the BS#12 generates a second tunnel with the BS#10 being the PC of the MS 410 by performing the binding update procedure with the BS#10 being the PC of the MS 410. Next, the BS#10 being the PC of the MS 410 forwards the packet received from the BS#01 to the BS#12 through the second tunnel in operation F.

The BS#12 being the new serving BS performs the binding update procedure with the BS#01 which manages the previous session, and thus directly receives the packet destined for the MS 410 from the BS#01 in operation G, rather than the PC BS#10.

Since the MS 410 is not in the idle mode any more, the BS#12 may release the tunnel and the MS context stored in the BS#10, with the BS#10 being the PC in operation I.

Figure 5:
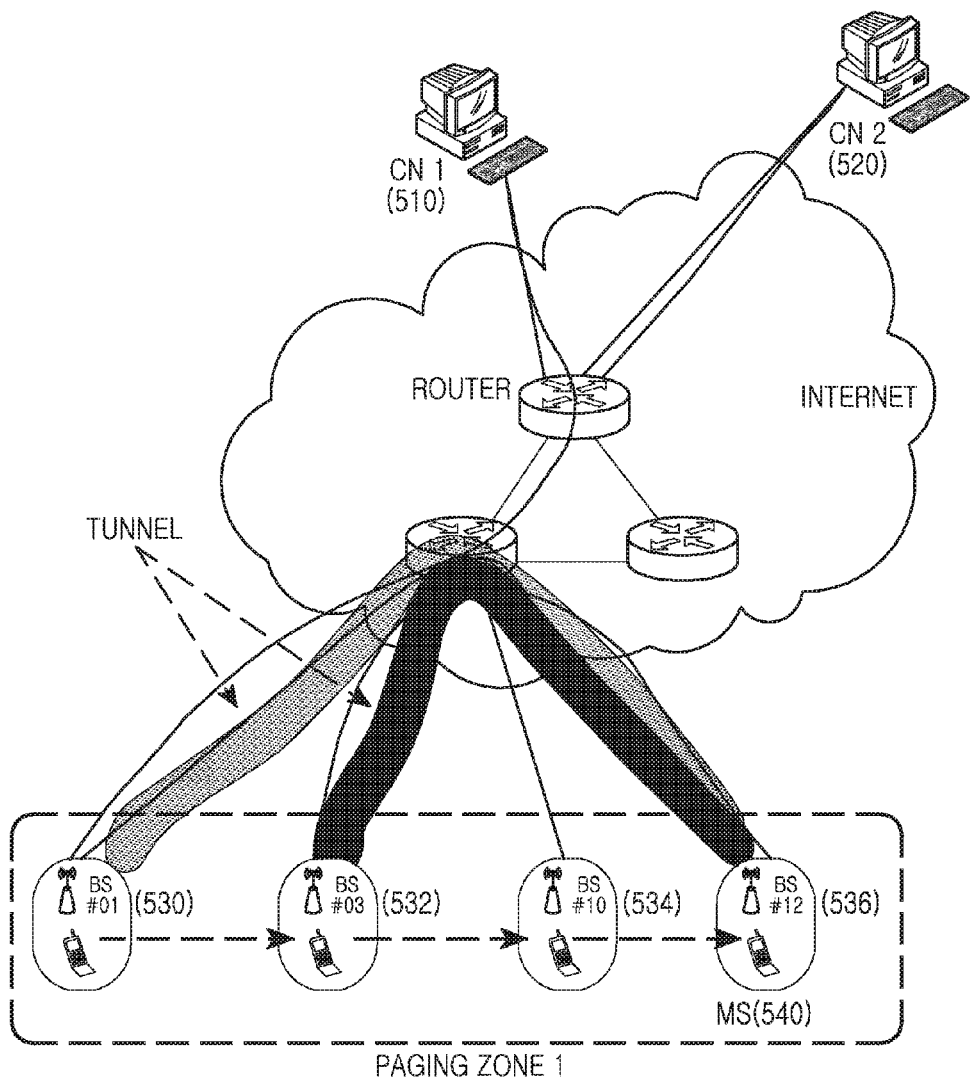
FIG. 5 is another diagram of paging of FIG. 4 when a packet for an idle mode MS is received at a BS according to an embodiment of the present disclosure.

FIG. 5 is another diagram of the paging when a packet for an idle mode MS is received at a BS according to an embodiment of the present disclosure.

Referring to FIG. 5, an MS 540 establishes a session by communicating with a CN1 510 via a BS#01 530, and a session by communicating with a CN2 520 via a BS#03 532. Herein, the MS 540 has different IP addresses for the BS#01 530 and the BS#03 532 and establishes the session with the CN1 510 and the CN2 520 using the different IP addresses.

Next, when the MS 540 migrates to the BS#10 534, the binding update procedure is performed between the BS#10 534 and the BS#01 530 and between the BS#10 534 and the BS#03 532 and thus a first tunnel and a second tunnel are generated. While the MS 540 stays around the BS#10 534, packets received at the BS#01 530 and the BS#03 532 from the CN1 510 and the CN2 520 are forwarded to the BS#10 534 through the first tunnel and the second tunnel.

When the MS 540 enters the idle mode, the BS#10 534 becomes the PC of the MS 540.

The MS 540 in the idle mode migrates from the BS#10 534 to the BS#12 536.

When receiving a packet for the MS 540 in the generated session, the BS#01 530 and the BS#03 532 forward the received packet to the BS#10 534 being the PC. Next, the BS#10 534 transmits a paging announcement message indicating the received packet for the MS 540, to the other BSs in the paging zone. The other BSs receiving the paging announcement message broadcast a paging advertisement message indicating the received packet destined for the MS.

The MS 540 receiving the paging advertisement message via the BS#12 536 performs the network reentry procedure with the BS#12 536. In so doing, the MS 540 informs the BS#12 536 of the BS being the MS' PC and the MS' home address. Such information is included in the message of the network reentry procedure. In this case, the BS#12 536 becomes a new serving BS for the MS 540.

After completing the reentry, the BS#12 536 may inform the BS#10 534 being the PC, of the network reentry of the MS 540, and receive, if necessary, the context of the MS 540 from the BS#10 534. The context of the MS may include the home address and the session information of the MS.

Next, the BS#12 536 generates a third tunnel for the BS#10 534 and a fourth tunnel for the BS#03 532 by performing the binding update procedure with the BS#10 534. Next, the BS#10 534 forwards packets received from the BS#01 530 and the BS#03 532 to the BS#12 536 through the third tunnel and the fourth tunnel.

In this case, the packet sent from the BS#01 530 to the BS#10 534 through the first tunnel is forwarded from the BS#10 534 to the BS#12 536 through the third tunnel, and the packet sent from the BS#03 532 to the BS#10 534 through the second tunnel is forwarded from the BS#10 534 to the BS#12 536 through the fourth tunnel.

Alternatively, the BS#12 536 being the new serving BS may perform the binding update procedure with the BS#01 530 and the BS#03 532 which manage the previous session, and thus receive the packet destined for the MS 540 directly from the BS#01 530 and the BS#03 532, free from the BS#10 534.

Figure 6:
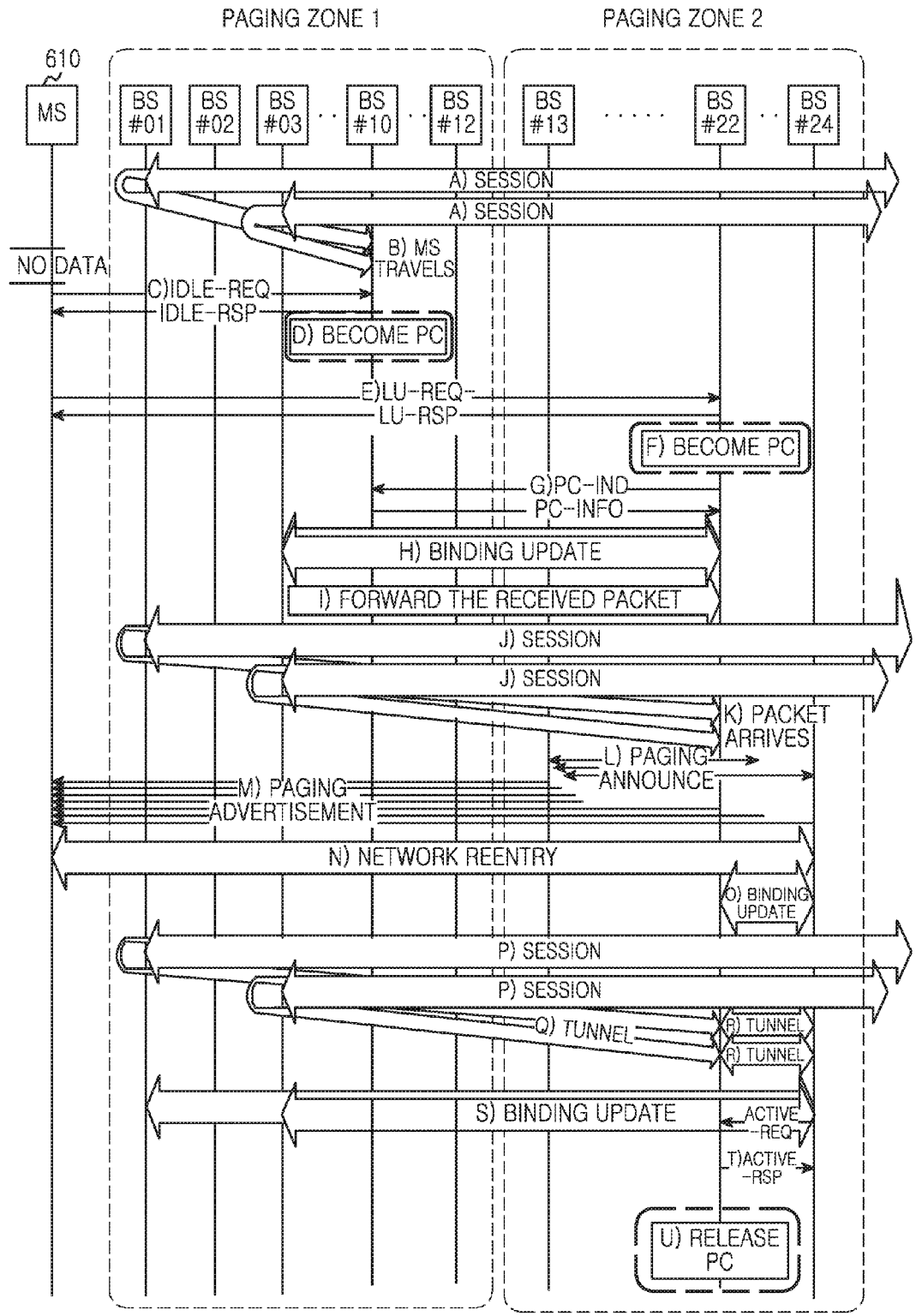
FIG. 6 is a diagram of paging when a packet for an idle mode MS is received at a BS according to an embodiment of the present disclosure.

FIG. 6 is a diagram of paging when a packet for an idle mode MS is received at a BS according to an embodiment of the present disclosure.

Referring to FIG. 6, when an MS 610 performs the location update procedure due to the paging zone change, the BS of the MS 610 location update becomes a new PC.

The MS 610 generates the session by communicating with the CN1 via the BS#01 and generates the session by communicating with the CN2 via the BS#03 in operation A.

When the MS 610 migrates to the BS#10, the tunnels are generated through the binding update procedure between the BS#10 and the BS#01 and between the BS#10 and the BS#03. While the MS 610 travels around the BS#10, packets received at the BS#01 and the BS#03 from the CN1 and the CN2 are forwarded to the BS#10 through the respective tunnels in operation B. Herein, the BS#01 and the BS#03 may be the previous serving BS of the MS 610.

When the MS 610 enters the idle mode in operation C, the BS#10 becomes the PC of the MS 610 in operation D and the MS 610 determines the BS#10 as the MS 610's PC.

When negotiating the idle mode entry with the BS#10, the MS 610 may provide previous PC information to the BS#10. The PC information may include an identifier of the PC.

Next, the MS 610 in the idle mode migrates to the BS#22 of the second paging zone. After migrating to the BS#22, the MS 610 recognizes the paging zone change based on the advertisement message broadcast by the BS#22 and performs the location update procedure with the BS#22 in operation E.

In the location update procedure, a LU-REQ message includes the PC (BS#10) information. The PC information may include the identifier of the PC.

The BS#22 becomes a new PC of the MS 610 in operation F. The BS#22 informs the BS#10 of the BS#22's PC for the MS 610 using a PC-IND message, receives a PC-INFO message in response, and obtains every context of the MS 610 from the PC-INFO message in operation G. The context of the MS 610 may include the home address and the session information of the MS 610.

The BS#22 performs the binding update procedure with the BS#10 being the previous serving BS of the MS 610 in operation H, and generates a new tunnel for receiving the packet forwarded from the BS#10 being the previous serving BS. The BS#22 may directly receive the previous session packet in operation I. Alternatively, the BS#22 may receive the packet in the previous session in operations J and K.

When receiving the packets in the corresponding sessions, the BS#22 transmits the paging announce message to every BS in the BS #22's paging zone in operation L. The BS receiving the paging announce message broadcasts the paging advertisement message in operation M.

The MS 610 receiving the paging advertisement message from the BS#24 performs the network reentry procedure with the BS#24 in operation N and performs the binding update procedure in operation O. In the network reentry procedure, the BS#24 may obtain information indicating that the previous PC of the MS 610 is the BS#22.

Next, the BS#24 generates the second tunnel with the BS#22 based on the previous PC (the BS#22) information obtained in the network reentry procedure. The BS#24 forwards packets received in the second tunnel, to the BS#24 in operations P and Q.

Alternatively, the BS#22 may capsulate and forward the packet to the BS#24, rather than generating the second tunnel, may in this case, the BS#24 may receive the capsulated packet, decapsulate the packet, and forward the decapsulated packet to the corresponding MS 610.

Alternatively, based on the MS 610 context obtained from the BS#22, the BS#24 may generate the tunnel through the binding update procedure with the BS#01 and the BS#03 in operations R and S and receive the packets directly from the BS#01 and the BS#03, free from the BS#22.

Since the MS 610 switches to the active mode, the BS#22 does not need to operate as the PC. Hence, the BS#22 terminates the PC function of the MS 610 by signaling ACTIVE-REQ/RSP (or RELEASE-REQ/RSP) messages in operations T and U.

Now, the last BS where the MS enters the idle mode becomes the PC, and the BS where the MS performs the location update procedure becomes the PC.

Figure 7:
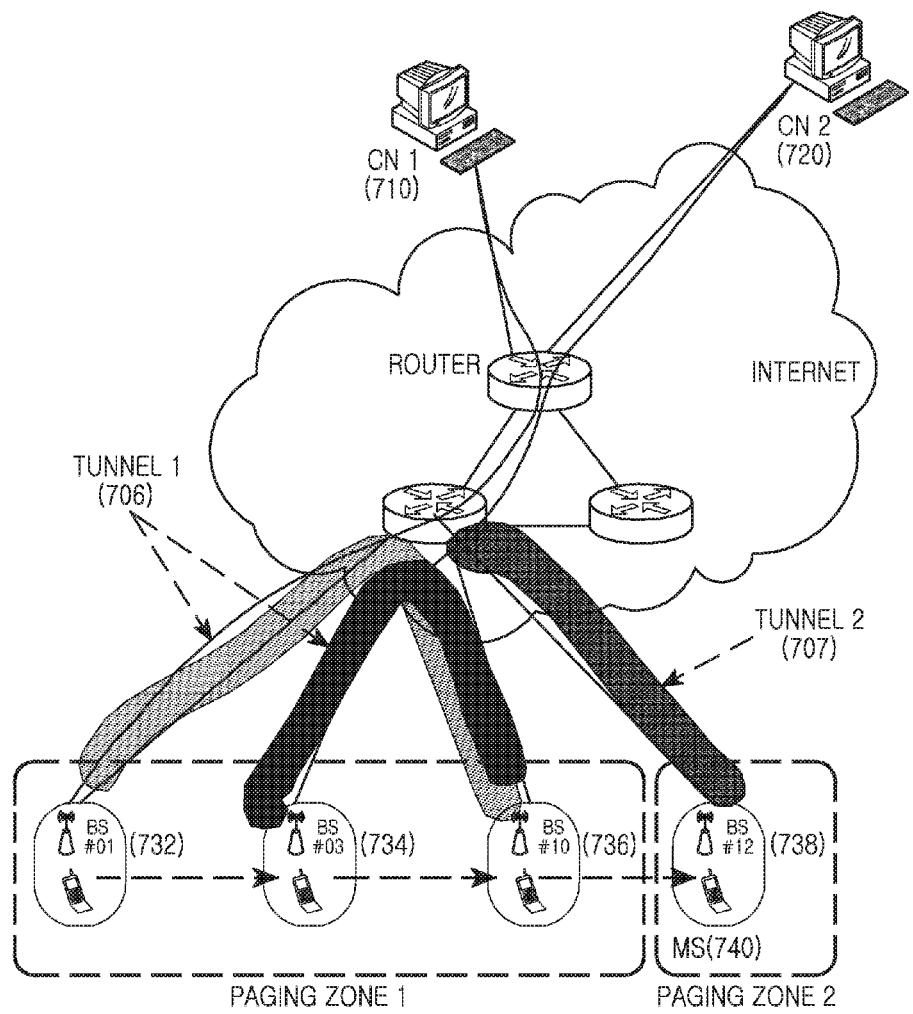
FIG. 7 is another diagram of paging when a packet for an idle mode MS is received at a BS according to an embodiment of the present disclosure.

FIG. 7 is another diagram of paging when a packet for an idle mode MS is received at a BS according to an embodiment of the present disclosure.

Referring to FIG. 7, an MS 740 establishes a session by communicating with a CN1 710 via a BS#01 732, and a session by communicating with a CN2 720 via a BS#03 734. The BS#01 732 and a BS#03 734 may be the previous serving BSs of the MS 740.

Next, when the MS 740 migrates to a BS#10 736, the binding update procedure is performed between the BS#10 736 and the BS#01 732 and between the BS#10 736 and the BS#03 734 and thus tunnels 706 and 707 are generated respectively. Herein, the two tunnels are referred to as a first tunnel.

While the MS 740 travels around the BS#10 736, packets received at the BS#01 732 and the BS#03 734 from the CN1 710 and the CN2 720 are forwarded to the BS#10 736 through the first tunnel. When the MS 740 enters the idle mode, the BS#10 736 becomes the PC of the MS 740. Next, the MS 740 in the idle mode migrates from the BS#10 736 to a BS#12 738 of a different paging zone.

The MS 740 recognizes the paging zone change based on the advertisement message and performs the location update procedure with the BS#12 738. The BS#12 738 becomes the PC of the MS 740.

Since the LU-REQ message includes the previous PC (BS#10 736) information in the location update procedure, the BS#12 738 may inform the BS#10 736 that the BS#12 738 becomes the PC of the MS using the PC-IND message. The previous PC information may include the identifier of the previous PC.

The BS#12 738 informs the BS#10 736 being the previous PC that the BS#12 738 is the PC of the MS 740, and receives every context of the MS 740 from the BS#10 736. The context of the MS includes the home address and the session information of the MS.

When the BS#12 738 perform the binding update procedures with the previous serving BSs being the BS#01 732 and the BS#03 734, a new third tunnel, instead of the first tunnel, is created between the BS#12 738 and the BS#01 732 and between the BS#10 736 and the BS#03 734. Packets destined for the MS 740, received at the BS#01 732 and the BS#03 734, may be immediately forwarded to the MS 740 through the third tunnel.

Figure 8:
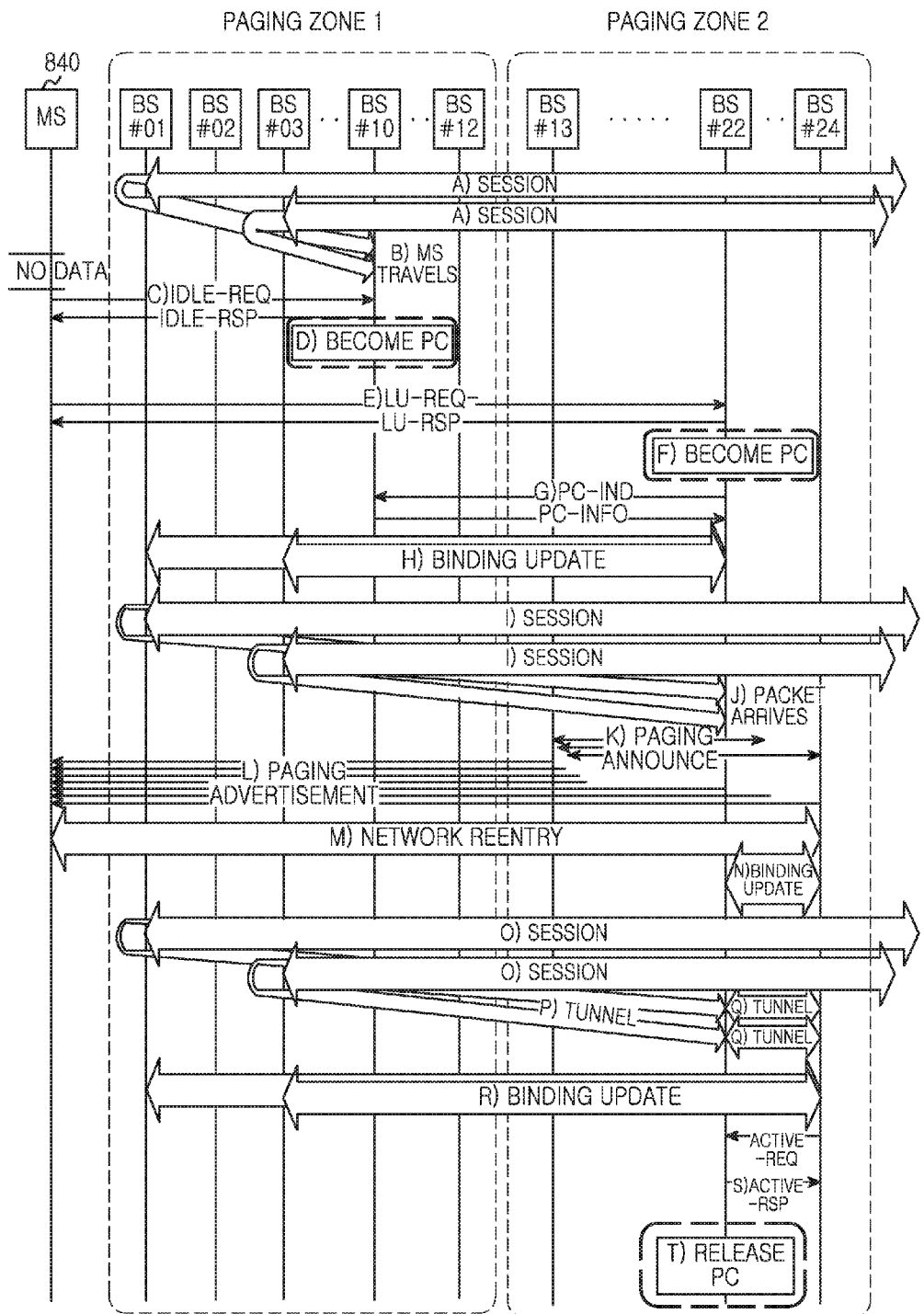
FIG. 8 is another diagram of paging when a packet for an idle mode MS is received at a BS according to an embodiment of the present disclosure.

FIG. 8 is another diagram of paging when a packet for an idle mode MS is received at a BS according to an embodiment of the present disclosure.

Referring to FIG. 8, when an MS 840 performs the location update procedure due to the paging zone change, a BS of the MS 840 location update becomes a new PC.

The MS 840 generates the session by communicating with a CN1 via a BS#01 and the session by communicating with the CN2 via a BS#03 in operation A.

When the MS 840 migrates to the BS#10, the tunnels are generated through the binding update procedure between the BS#10 and the BS#01 and between the BS#10 and a BS#03. When the MS migrates to the BS#10, packets received at the BS#01 and the BS#03 from the CN1 and a CN2 are forwarded to the BS#10 through the respective tunnels in operation B. Herein, the BS#01 and the BS#03 may be the previous serving BS of the MS 840.

When the MS 840 enters the idle mode in operation C, the BS#10 becomes the PC of the MS 840 in operation D and the MS determines the BS#10 as the MS 840's PC.

Next, the MS 840 migrates to the BS#22 of the other paging zone. After migrating to the BS#22, the MS 840 recognizes the paging zone change based on the advertisement message broadcast by the BS#22 and performs the location update procedure with the BS#22 in operation E. Since the LU-REQ message includes the previous PC (BS#10) information in the location update procedure, the BS#22 may inform the BS#10 736 that the BS#22 becomes the PC of the MS 840 using the PC-IND message. The previous PC information may include the identifier of the previous PC.

Next, the BS#22 becomes the PC of the MS 840 in operation F.

The BS#22 transmits to the BS#10 the PC-IND message notifying that the BS#22 becomes the PC of the MS 840, and receives a response message (PC-INFO) including the MS context in operation G. The context of the MS 840 may include the home address and the session information of the MS 840. The PC-IND message includes the new PC (BS#22) information of the MS 840.

To generate tunnels (referred to as a first tunnel (706)) for receiving the packet from the BS#01 and the BS#03, the BS#22 performs the binding update procedure with the BS#01 and the BS#03 in operation H. Next, the BS#22 may receive packets destined for the MS 840, from the BS#01 and the BS#03 through the first tunnel 706 in operations I and J.

Upon receiving the packet, the BS#22 transmits the paging announce message to every BS in the BS#22's paging zone in operation K. The BS receiving the paging announce message generates and broadcasts the paging advertisement message indicating the received packet destined for the MS 840 in operation L, and thus informs of the received packet destined for the MS 840. The MS 840 is assumed to travel around the BS#24.

The MS 840 receiving the paging advertisement message from the BS#24 determines the packet destined for the MS 840's and performs the network reentry procedure with the BS#24 in operation M.

The BS#24 generates a second tunnel 707 by performing the binding update procedure with the BS#22 based on the PC information obtained in the network reentry procedure in operation N. The BS#22 forwards the packet received in the first tunnel, to the BS#24 through the second tunnel in operations O, P, and Q. The PC information may indicate which BS in the current paging zone is the PC of the MS 840.

Next, the MS 840 may generate a new third tunnel by performing the binding update procedure with the BS#10 and the BS#03 in operation R and thus receive the packets directly from the BS#01 and the BS#03, free from the BS#22 being the PC.

Since the MS 840 enters the active mode, the BS#22 does not need to operate as the PC any more. Hence, the BS#24 may signal the ACTIVE-REQ/RSP (or RELEASE-REQ/RSP) messages with the BS#22 in operation S so that the BS#22 may terminate the BS#22's PC function for the MS in operation T.

Figure 9:
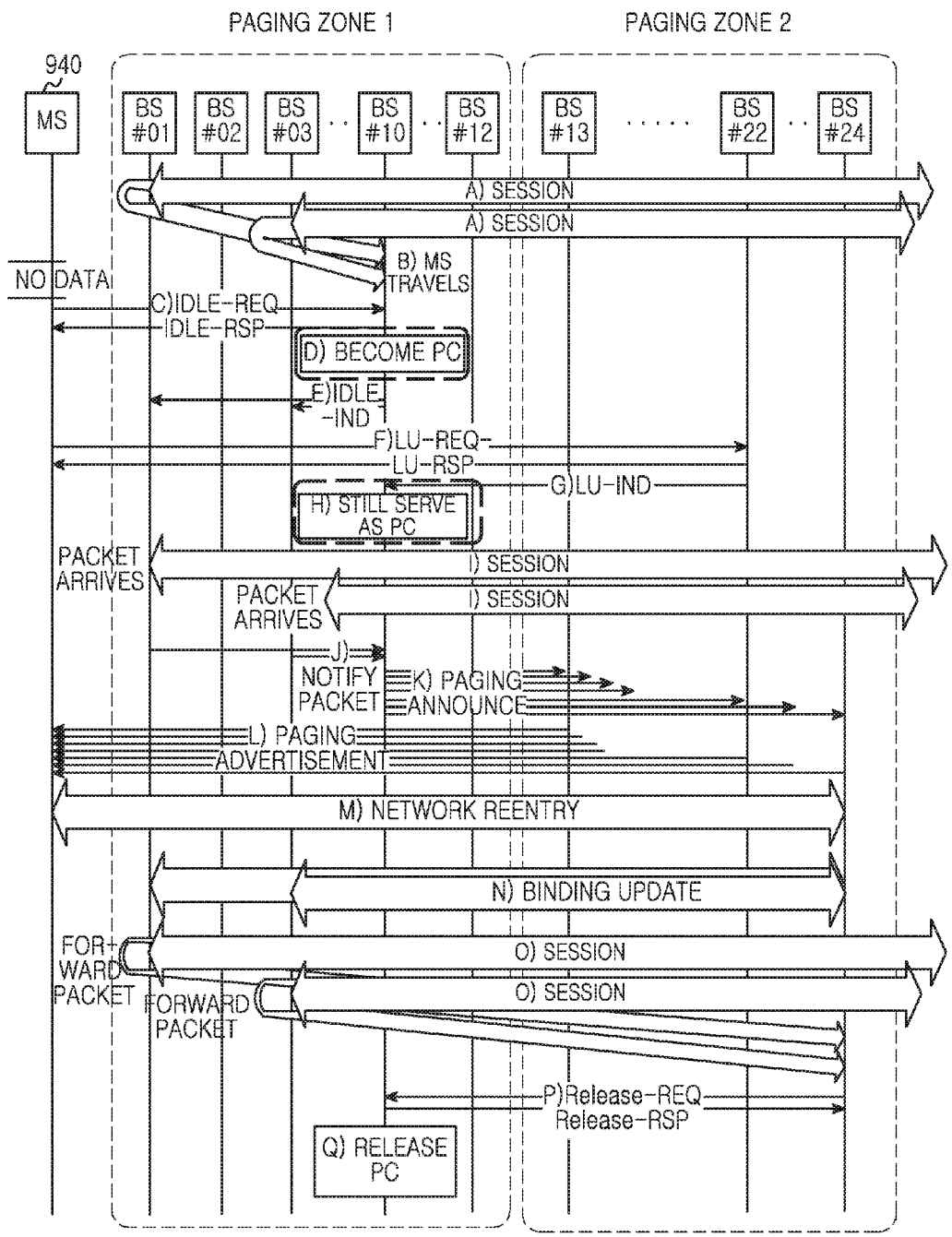
FIG. 9 is another diagram of paging when a packet for an idle mode MS is received at a BS according to an embodiment of the present disclosure.

FIG. 9 is another diagram of paging when a packet for an idle mode MS is received at a BS according to an embodiment of the present disclosure.

Referring to FIG. 9, when the MS performs the location update procedure due to the paging zone change, the BS of the MS location update does not become a new PC.

Referring to FIG. 9, an MS 940 generates the session by communicating with a CN1 via a BS#01 and the session by communicating with the CN2 via the BS#03 in operation A.

When the MS 940 migrates to the BS#10, the tunnels are generated through the binding update procedure between the BS#10 and the BS#01 and between the BS#10 and the BS#03. While the MS 940 travels around the BS#10, packets received at a BS#01 and a BS#03 from the CN1 and a CN2 are forwarded to the BS#10 through the respective tunnels in operation B. Herein, the BS#01 and the BS#03 may be the previous serving BSs of the MS 940.

When the MS enters the idle mode in operation C, the BS#10 becomes the PC of the MS in operation D and the MS determines the BS#10 as the MS' PC.

When negotiating the idle mode entry with the BS#10, the MS may provide the MS' previous PC information to the BS#10. The PC information may include the identifier of the PC.

The BS#10 transmits to the BS#01 and the BS#03 a message (IDLE-IND) indicating the MS 940 idle mode entry in operation E. Herein, for the secure operation, an acknowledgement message may be exchanged in relation to the IDLE-IND message.

Next, the MS 940 in the idle mode migrates to a BS#22 of the second paging zone. After migrating to the BS#22, the MS 940 recognizes the paging zone change based on the advertisement message broadcast by the BS#22 and performs the location update procedure with the BS#22 in operation F.

In the location update procedure, the LU-REQ message includes the PC (BS#10) information. The PC information may include the identifier of the PC.

The BS#22 transmits an LU-IND message indicating the location update procedure of the MS 940 to the BS#10 being the previous PC in operation G. The LU-IND message includes a BS list of BSs in the second paging zone which is the new paging zone.

The BS#10 receiving the LU-IND message may identify the BS in the current paging zone of the MS 940. The existing PC is not changed even when the MS 940 performs the location update according to the paging zone change in operation H.

When receiving the packet destined for the MS 940 in the generated session in operation I, the BS#01 and the BS#03 inform the BS#10 being the PC of the packet reception in operation J. The BS#10 transmits the paging announce message indicating the received packet destined for the MS 940, to the other BSs of the second paging zone in operation K.

The BS#01 and the BS#03 may store the packet in a buffer and inform of the packet reception, rather than immediately transmitting the received packet to the BS#10 being the PC.

The other BSs receiving the paging announce message generate and broadcast the paging advertisement message indicating the received packet destined for the MS 940 in operation L.

For example, since the BS#10 knows that the BS where the MS 940 performs the location update is the BS#22, the BS#10 may transmit the paging announce message to the BS#22 and the BS#22 may transmit the received paging announce message to the other BSs in the second paging zone, instead of the BS#10.

The MS 940 receiving the paging announce message from the BS#22 performs the network reentry procedure with the BS#22 in operation M.

Next, the BS#22 generates the tunnel by performing the binding update procedure with the BS#01 and the BS#03 being the previous serving BSs in operation N. The BS#22, which supports the mobile IP, holds the previous serving BS information of the MS 940.

The BS#01 and the BS#03 being the previous serving BSs forward the packet stored in the buffer, to the BS#22 through the generated tunnel in operation O.

Since the MS 940 enters the active mode, the BS#10 does not need to operate as the PC any more. Hence, the BS#24 may signal the ACTIVE-REQ/RSP (or RELEASE-REQ/RSP) messages with the BS#10 in operation P so that the BS#10 may terminate the BS#10's PC function for the MS 940 in operation Q.

Figure 10:
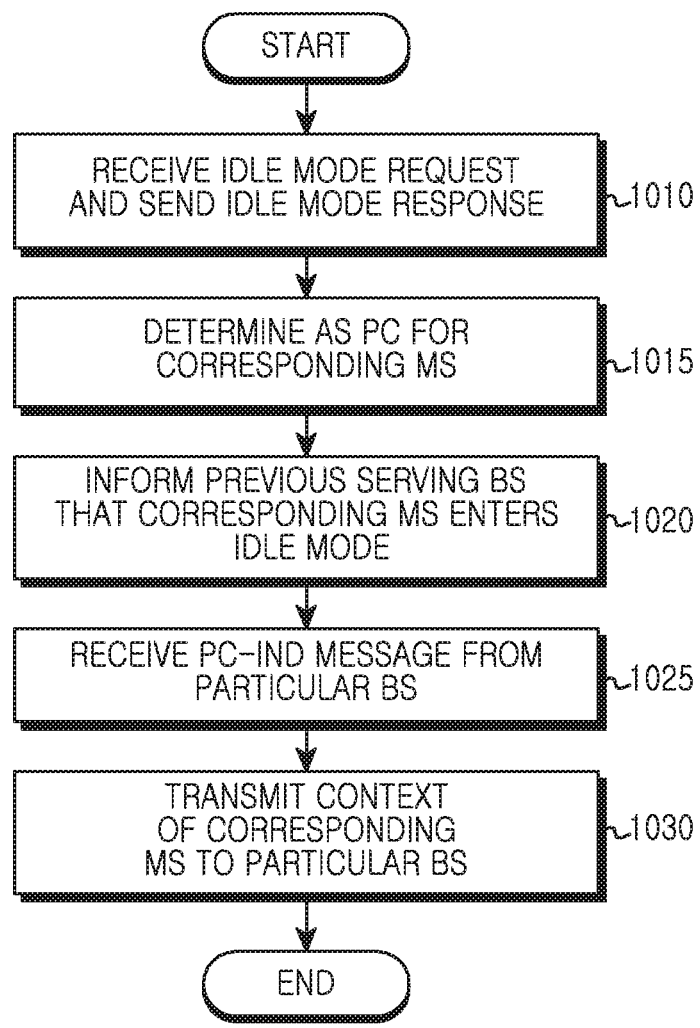
FIG. 10 is a flowchart of BS operations serving as a PC of an MS according to an embodiment of the present disclosure.

FIG. 10 is a flowchart of BS operations serving as a PC of a MS according to an embodiment of the present disclosure.

Referring to FIG. 10, a BS receives an idle mode request from an MS and transmits a response to the MS in operation 1010. In operation 1015, the BS is determined as a PC of the MS. The MS determines the BS as the MS' PC.

When the MS negotiates the idle mode entry with the BS#10, the MS may provide the BS#10 with the MS's previous PC information. The PC information may include the identifier of the PC.

In operation 1020, the BS may inform the previous serving BS of the MS, of the MS idle mode entry. Operation 1020 may be skipped if necessary.

In operation 1025, the BS receives a PC-IND message from a particular BS. The PC-IND message notifies that the particular BS becomes a new PC of the MS.

In operation 1030, the BS transmits the context of the MS to the particular BS. The MS context may include the home address and the session information of the MS.

Figure 11:
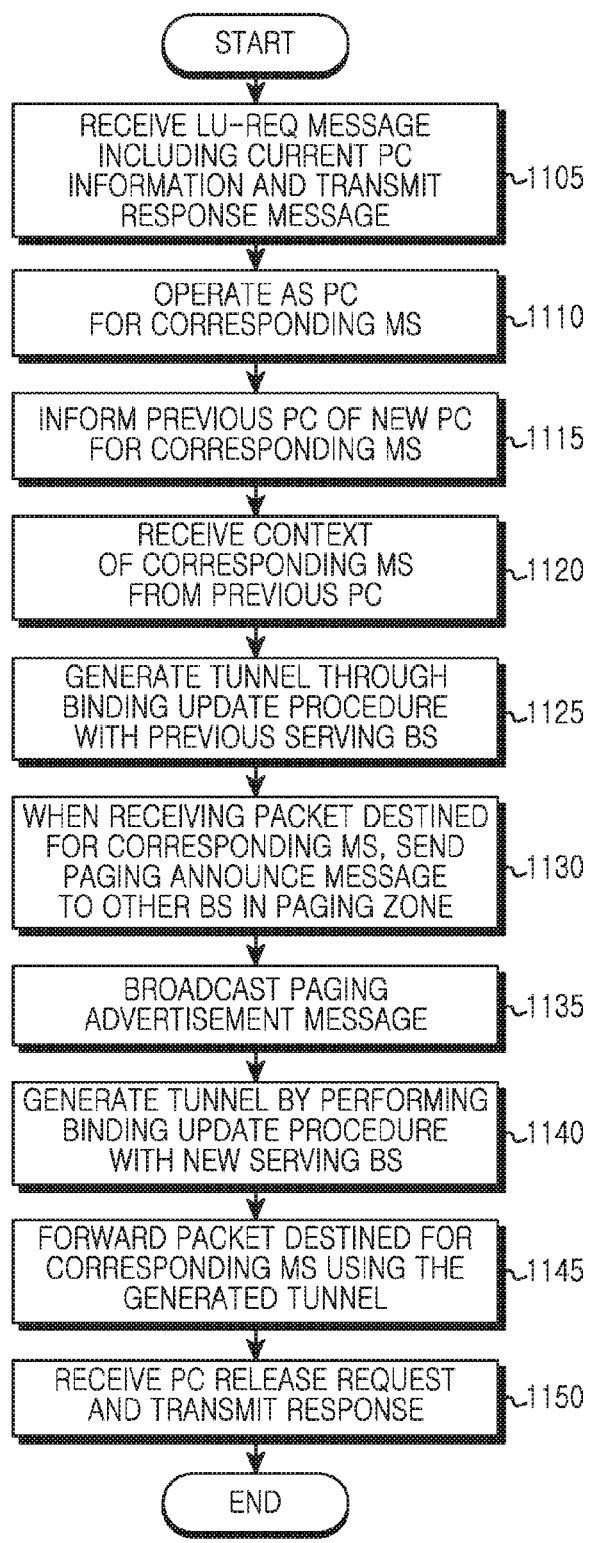
FIG. 11 is a flowchart of BS operations serving as a PC through an MS location update according to an embodiment of the present disclosure.

FIG. 11 is a flowchart of BS operations serving as a PC through an MS location update according to an embodiment of the present disclosure.

Referring to FIG. 11, a BS receives a LU-REQ message including a current PC information from an MS and transmits a response message in operation 1105. The LU-REQ message in the location update procedure includes the previous PC information. The previous PC information may include the identifier of the previous PC.

In operation 1110, the BS operates as the PC for the corresponding MS.

In operation 1115, the BS informs the previous PC of the BS' new PC for the corresponding MS.

In operation 1120, the BS receives the context of the corresponding MS from the previous PC. The context of the MS includes the home address and the session information of the MS.

In operation 1125, the BS generates the tunnel through the binding update procedure with the previous serving BS. The BS, which supports the mobile IP, holds the previous serving BS information of the MS.

Next, when receiving the packet destined for the corresponding MS, the BS transmits the paging announce message indicating the packet reception to the other BS of the MS paging zone in operation 1130.

In operation 1135, the BS broadcasts the paging advertisement message for notifying the received packet destined for the MS.

In operation 1140, the BS generates the tunnel through the binding update procedure with the new serving BS.

In operation 1145, the BS forwards the packet destined for the corresponding MS, to the new serving BS using the generated tunnel.

Since the MS is in the active mode, to release the new PC, the BS requests the new PC to release the PC and receives the response in operation 1150.

Figure 12:
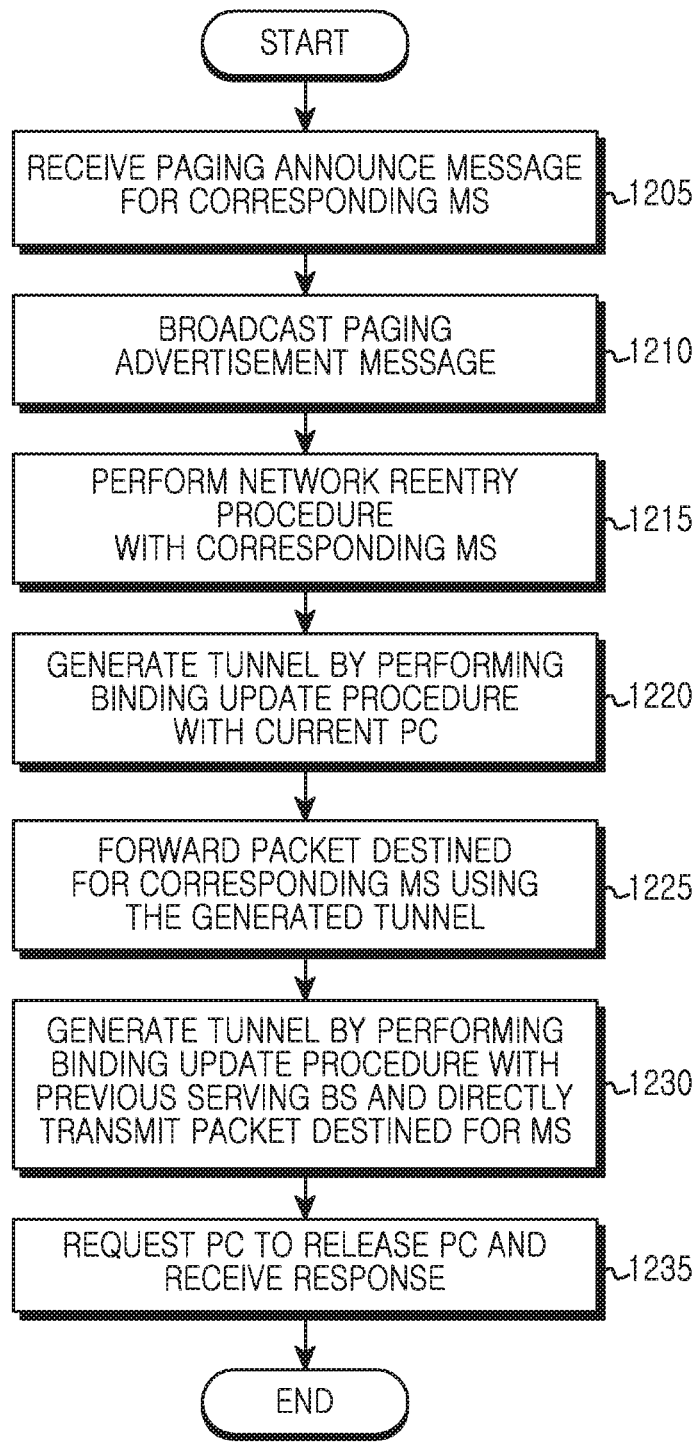
FIG. 12 is a flowchart of BS operations for an MS network reentry according to an embodiment of the present disclosure.

FIG. 12 is a flowchart of BS operations for a MS network reentry according to an embodiment of the present disclosure.

Referring to FIG. 12, a BS receives the paging announce message indicating the received packet destined for a corresponding MS, from a PC in operation 1205, and broadcast the paging advertisement message for notifying the received packet destined for the MS in operation 1210.

In operation 1215, the BS performs the network reentry procedure with the corresponding MS.

In so doing, the MS informs the BS of the MS' current PC BS and the MS' home address. Such information is included in the message in the network reentry procedure. The BS becomes the new serving BS of the MS.

In operation 1220, the BS generates the tunnel through the binding update procedure with the current PC.

In operation 1225, the BS receives and forwards the packet destined for the MS to the corresponding MS using the generated tunnel.

In operation 1230, the BS generates the tunnel through the binding update procedure with the previous PC and directly transmits the packet destined for the MS using the generated tunnel.

Since the MS in the active mode, to release the current PC, the BS requests the current PC to release the PC and receives the response in operation 1235.

Figure 13:
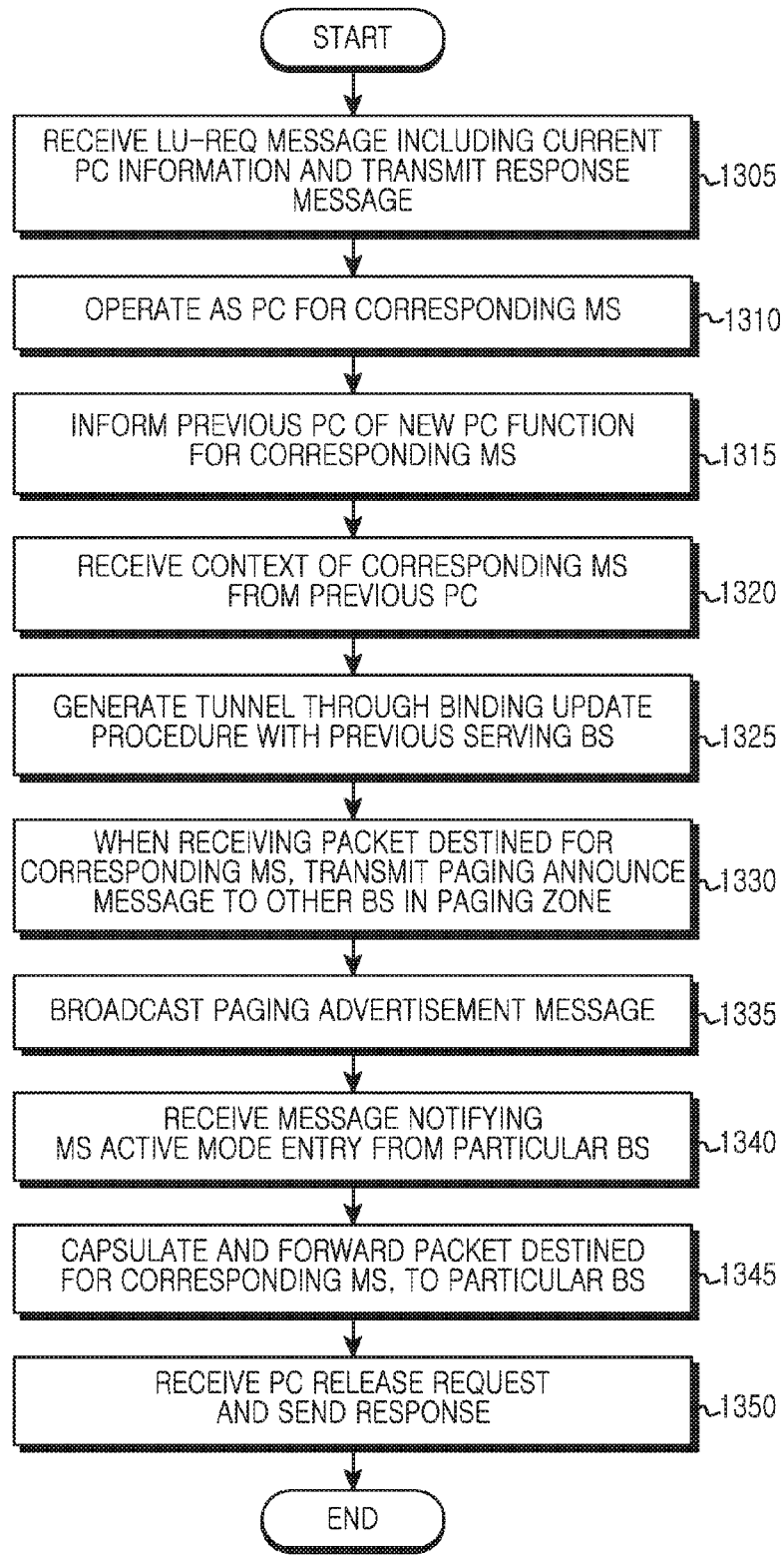
FIG. 13 is another flowchart of BS operations serving as a PC through an MS location update according to an embodiment of the present disclosure.

FIG. 13 is another flowchart of BS operations serving as a PC through a MS location update according to an embodiment of the present disclosure.

Referring to FIG. 13, a BS receives a LU-REQ message including a current PC information from an MS and transmits the response message in operation 1305. The LU-REQ message in the location update procedure includes a previous PC information. The previous PC information may include the identifier of the previous PC.

In operation 1310, the BS operates as the PC for the MS.

In operation 1315, the BS informs the previous PC of the BS' new PC for the corresponding MS.

In operation 1320, the BS receives the context of the corresponding MS from the previous PC. The context of the MS includes the home address and the session information of the MS.

In operation 1325, the BS generates the tunnel through the binding update procedure with the previous serving BS. The BS, which supports the mobile IP, holds the previous serving BS information of the MS.

Next, when receiving the packet destined for the corresponding MS, the BS transmits the paging announce message indicating the packet reception to the other BS of the MS paging zone in operation 1330.

In operation 1335, the BS broadcasts the paging advertisement message for notifying the packet destined for the MS.

In operation 1340, the BS receives a message notifying the MS active mode entry from a particular BS.

In operation 1345, the BS capsulates and forwards the packet destined for the corresponding MS, to the particular BS.

Since the MS is in the active mode, to release the new PC, the BS requests the new PC to release the PC and receives the response in operation 1350.

Figure 14:
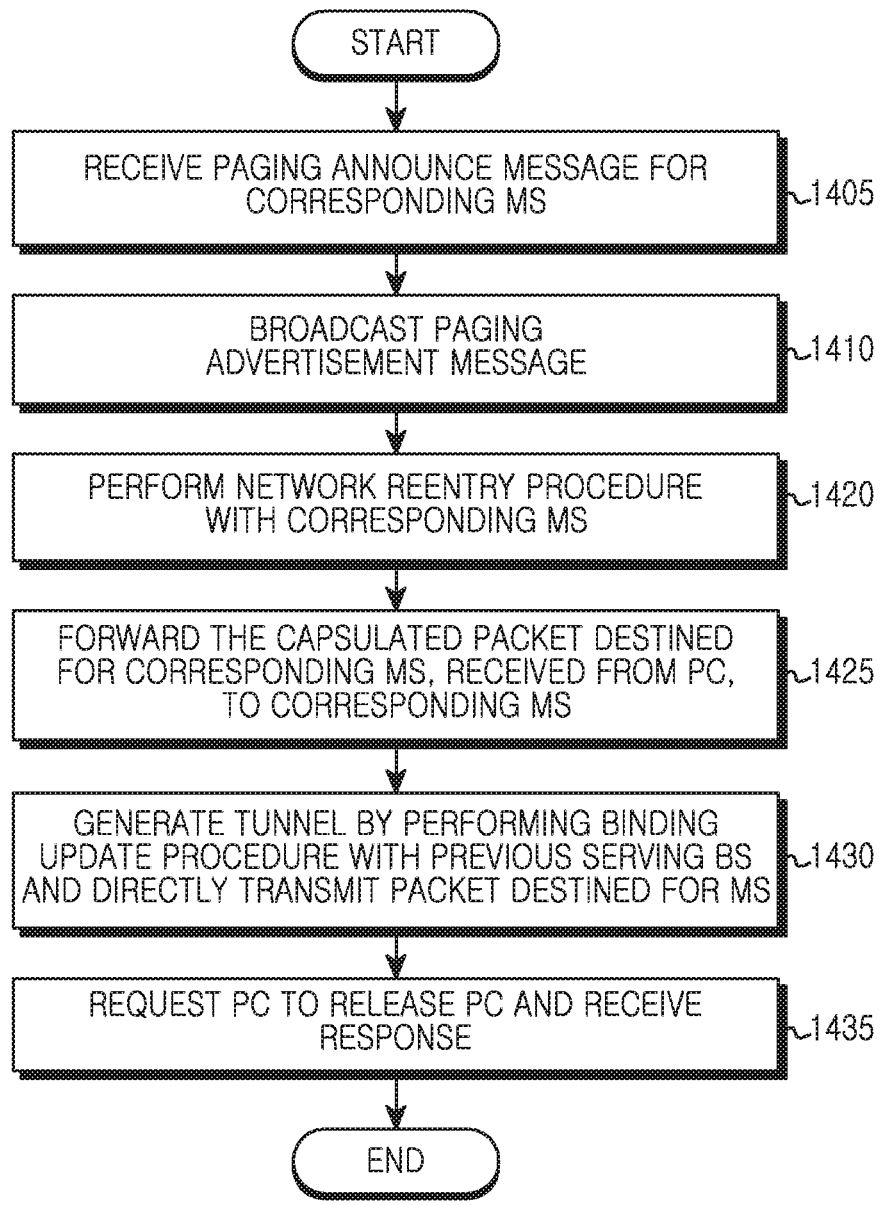
FIG. 14 is another flowchart of BS operations for an MS network reentry according to an embodiment of the present disclosure.

FIG. 14 is another flowchart of BS operations for an MS network reentry according to an embodiment of the present disclosure.

Referring to FIG. 14, a BS receives the paging announce message indicating the received packet destined for a corresponding MS, from a PC in operation 1405, and broadcasts the paging advertisement message for notifying the received packet destined for the MS in operation 1410.

In operation 1420, the BS performs the network reentry procedure with the MS.

In so doing, the MS informs the BS of the MS' current PC BS and the MS' home address. Such information is included in the message in the network reentry procedure. The BS becomes the new serving BS of the MS. The BS may transmit the message indicating the active mode MS, to the current PC.

In operation 1425, the BS forwards the capsulated packet destined for the corresponding MS, from the PC to the MS.

In operation 1430, the BS generates the tunnel through the binding update procedure with the previous PC and directly transmits the packet destined for the MS using the generated tunnel. The BS, which supports the mobile IP, holds the previous serving BS information of the MS.

Since the MS in the active mode, to release the current PC, the BS requests the current PC to release the PC and receives the response in operation 1435.

Figure 15:
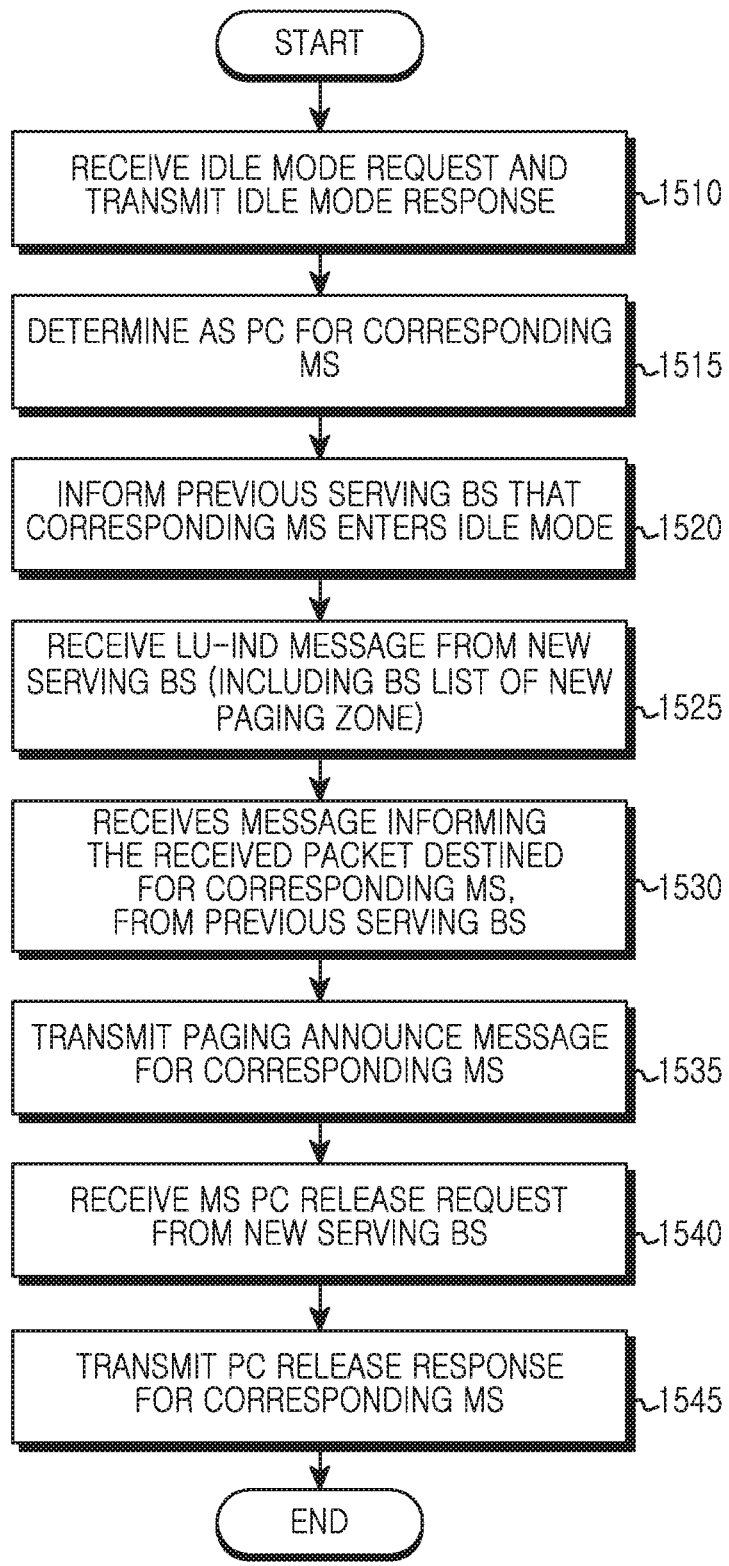
FIG. 15 is another flowchart of BS operations serving as a PC of an MS according to an embodiment of the present disclosure.

FIG. 15 is another flowchart of BS operations serving as a PC of an MS according to an embodiment of the present disclosure.

Referring to FIG. 15, a BS receives the idle mode request from an MS and transmits the response to the MS in operation 1510. In operation 1515, the BS is determined as the PC of the corresponding MS. The MS determines the BS as the MS' PC.

When negotiating the idle mode entry with the BS#10, the MS may provide the BS#10 with the MS' previous PC information. The PC information may include the identifier of the PC.

In operation 1520, the BS may inform the previous serving BS of the corresponding MS, of the MS idle mode entry. For doing so, the IDLE-IND message is used. The BS, which supports the mobile IP, holds the previous BS information of the MS.

In operation 1525, the BS receives the LU-IND message from the new serving BS of the corresponding MS. The LU-IND message includes the BS list of the new paging zone of the MS. For doing so, the LU-IND message is used.

In operation 1530, the BS receives the message informing of the received packet destined for the corresponding MS, from the previous serving BS.

In operation 1535, the BS transmits the paging announce message of the corresponding MS to the BSs of the MS paging zone.

In operation 1540, the BS receives the MS PC release request from the new serving BS. In operation 1545, the BS releases the corresponding MS PC and transmits the response message to the new serving BS.

Figure 16:
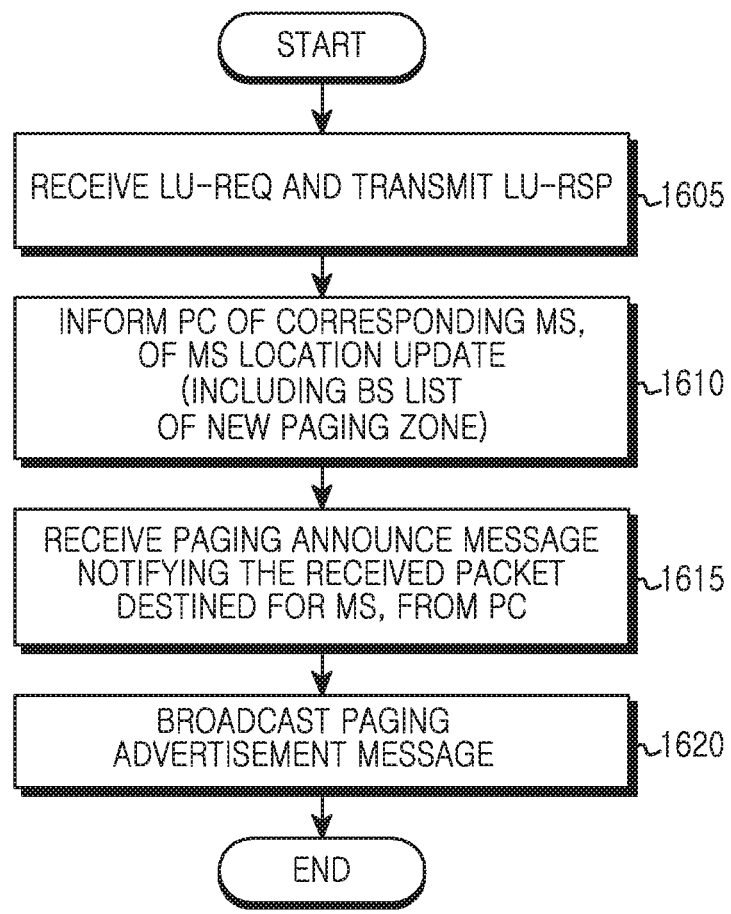
FIG. 16 is another flowchart of BS operations for an MS location update according to an embodiment of the present disclosure.

FIG. 16 is another flowchart of BS operations for an MS location update according to an embodiment of the present disclosure.

Referring to FIG. 16, a BS receives a LU-REQ from tan MS, processes the LU-REQ, and transmits the response message to the MS in operation 1605. In the location update procedure, the LU-REQ message includes PC information. The PC information may include the identifier of the PC.

In operation 1610, the BS informs the MS PC of the MS location update. For doing so, the LU-IND message is used and includes the BS list of the new paging zone of the MS.

In operation 1615, the BS receives the paging announce message notifying the received packet destined for the MS, from the PC.

In operation 1620, the BS broadcasts the paging advertisement message for notifying the received packet destined for the MS.

Figure 17:
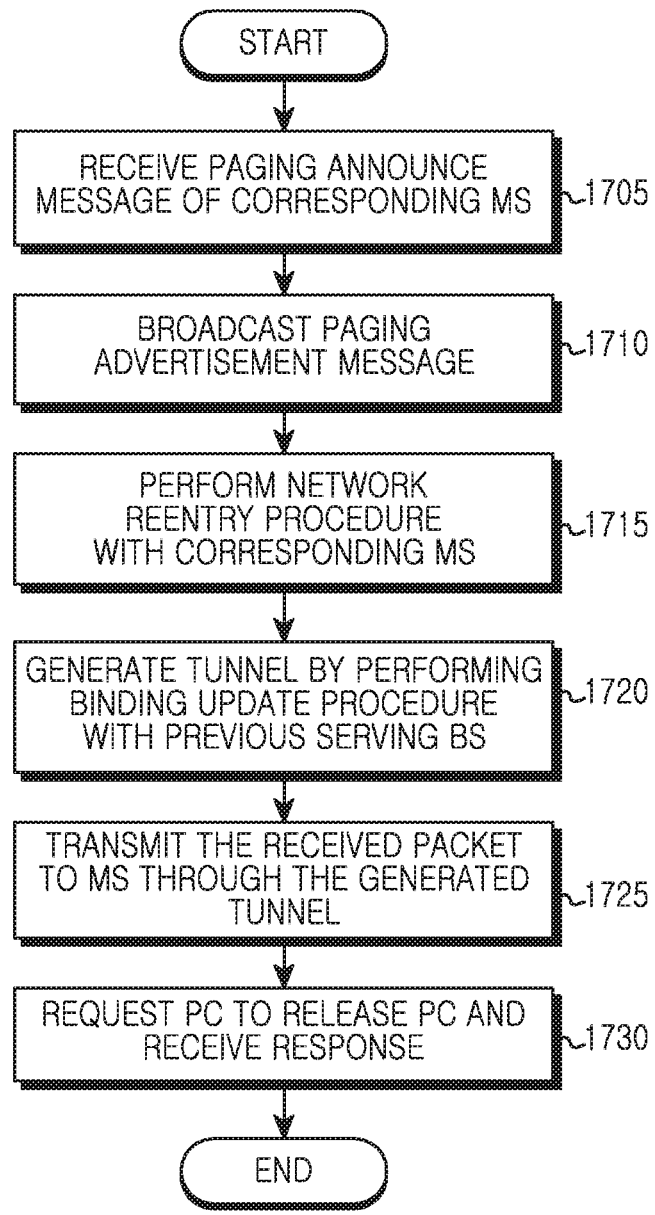
FIG. 17 is another flowchart of BS operations for an MS network reentry according to an embodiment of the present disclosure.

FIG. 17 is another flowchart of BS operations for an MS network reentry according to an embodiment of the present disclosure.

Referring to FIG. 17, a BS receives the paging announce message indicating the received packet destined for a corresponding MS, from the PC in operation 1705, and broadcasts the paging advertisement message for notifying the received packet destined for the MS in operation 1710.

In operation 1715, the BS performs the network reentry procedure with the corresponding MS.

In operation 1720, the BS generates the tunnel through the binding update procedure with the previous PC of the MS. The BS, which supports the mobile IP, holds the previous serving BS information of the MS.

In operation 1725, the BS forwards the received packet to the MS through the generated tunnel.

Since the MS in the active mode, to release the current PC, the BS requests the PC to release the PC and receives the response in operation 1730.

Figure 18:
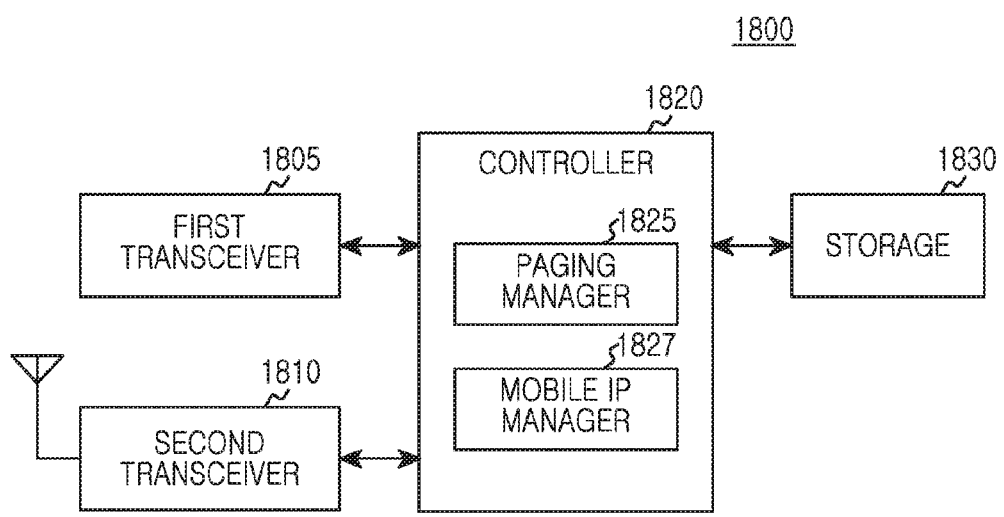
FIG. 18 is a block diagram of a BS according to an embodiment of the present disclosure.

FIG. 18 is a block diagram of a BS according to an embodiment of the present disclosure.

Referring to FIG. 18, a BS 1800 includes a first transceiver 1805, a second transceiver 1810, a controller 1820, and a storage 1830.

The first transceiver 1805 communicates with the other BS 1800 via a backhaul. That is, the first transceiver 1805 communicates with the other BS based the control and data from the controller 1820.

The second transceiver 1810 includes a Radio Frequency (RF) circuitry and a modem. The RF circuitry transmits and receives signals over a radio channel using signal band conversion and amplification. That is, the RF circuitry up-converts a baseband signal fed from the modem to an RF signal, transmits the RF signal over an antenna, and down-converts an RF signal received over the antenna to the baseband signal. For example, the RF circuitry may include an amplifier, a mixer, an oscillator, a digital to analog converter (DAC), and an analog to digital converter (ADC). While the single antenna is depicted in FIG. 18, the BS 1800 may include a plurality of antennas.

The modem converts the baseband signal and the bit stream according to a physical layer standard of the system. For example, for the data transmission according to orthogonal frequency division multiplexing (OFDM), the modem generates complex symbols by encoding and modulating the transmit bit stream, maps the complex symbols to subcarriers, and generates OFDM symbols using inverse fast fourier transform (IFFT) and cyclic prefix (CP) addition. For the data reception, the modem splits the baseband signal fed from the RF circuitry, to the OFDM symbols, restores the signals mapped to the subcarriers using FFT, and then restores the received bit stream by demodulating and decoding the received bit stream.

The controller 1820 controls the operations of the BS 1800. For example, the controller 1820 transmits and receives the signals by controlling the first transceiver 1805 and the second transceiver 1810, and operates as the PC and the mobile IP. The controller 1820 may operate as the BS for the location update and the BS 1800 for the network reentry. The controller 1820 may include at least one processor.

The storage 1830 stores data generated or used by the controller 1820. In particular, the storage 1830 stores the paging zone, a BS list of the paging zone, and the PC information.

The controller 1820 includes a paging manager 1825 and a mobile IP manager 1827.

The paging manager 1825 provides the PC function to the BS. The paging manager 1825 provides the PC function for the MS when the MS in the BS coverage enters the idle mode. When the MS requests the location update, the paging manager 1825 performs the PC function for the MS. When the BS becomes the new PC for the MS, the paging manager 1825 notifies the previous PC that the BS becomes the new PC for the MS.

When the packet destined for the MS is received or the packet reception is informed, the paging manager 1825 transmits the paging announce message to the other BS in the paging zone of the MS and broadcasts the paging advertisement message through the second transceiver 1810. The paging control function is the PC function and is explained in detailed in FIGS. 6, 8, and 9.

The mobile IP manager 1827 provides the mobile IP function to the BS. That is, when the MS receives the paging advertisement message through the second transceiver 1810 and performs the network reentry procedure through the paging manager 1825, the mobile IP manager 1827 performs the binding update procedure with the previous serving BS of the MS and generates the tunnel. Next, the mobile IP manager 1827 forwards the received packet to the MS through the tunnel.

In the network reentry procedure through the paging manager 1825, the mobile IP manager 1827 performs the binding update procedure with the BS being the PC of the MS and generates the tunnel. Next, the mobile IP manager 1827 forwards the received packet to the MS through the tunnel.

When receiving the message notifying the MS of the active mode from the new serving BS of the MS, the mobile IP manager 1827 encapsulates and forwards the packet destined for the MS to the new serving BS.

Figure 19:
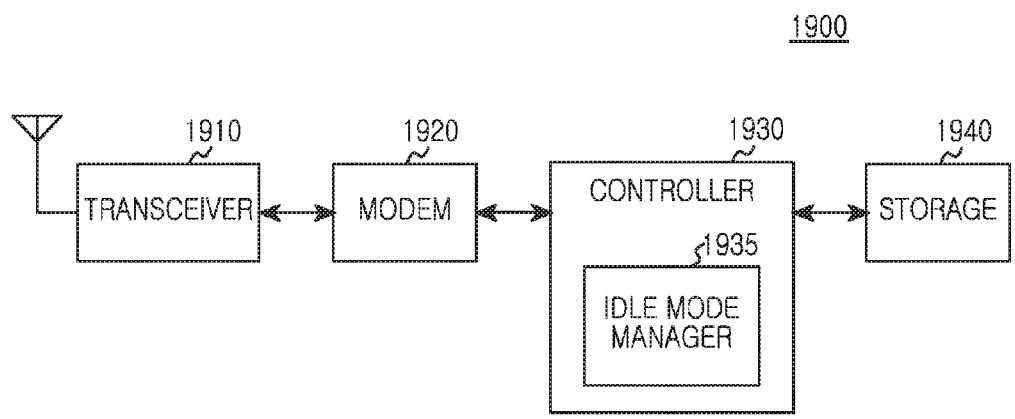
FIG. 19 is a block diagram of an MS according to an embodiment of the present disclosure.

FIG. 19 is a block diagram of an MS according to an embodiment of the present disclosure.

Referring to FIG. 19, a MS 1900 includes a transceiver 1910, a modem 1920, a controller 1930, and a storage 1940.

The transceiver 1910 transmits and receives signals over the radio channel using the signal band conversion and amplification. That is, the transceiver 1910 up-converts a baseband signal fed from the modem 1920 to an RF signal, transmits the RF signal over an antenna, and down-converts an RF signal received over the antenna to the baseband signal. For example, the transceiver 1910 may include an amplifier, a mixer, an oscillator, a DAC and an ADC. While the single antenna is depicted in FIG. 19, the MS 1900 may include a plurality of antennas.

The modem 1920 converts the baseband signal and the bit stream according to the physical layer standard of the system. For example, for the data transmission according to the OFDM, the modem 1920 generates complex symbols by encoding and modulating the transmit bit stream, maps the complex symbols to subcarriers, and generates OFDM symbols using the IFFT and the CP addition. For the data reception, the modem 1920 splits the baseband signal fed from the transceiver 1910, to the OFDM symbols, restores the signals mapped to the subcarriers using the FFT, and then restores the received bit stream by demodulating and decoding the received bit stream.

The controller 1930 controls the operations of the MS 1900. For example, the controller 1930 transmits and receives the signals through the modem 1920 and the transceiver 1910. The controller 1930 includes an idle mode manager 1935. For the idle mode entry, the idle mode manager 1935 determines the BS of the idle mode negotiation as the PC. The idle mode manager 1935 informs the BS of the idle mode negotiation, of the BS being the PC of the MS 1900.

For the location update, the idle mode manager 1935 determines the BS of the location update negotiation as the PC. The idle mode manager 1935 informs the BS of the location update negotiation, of the BS being the PC of the MS 1900.

The idle mode manager 1935 informs the BS of the network reentry negotiation, of the BS being the PC of the MS 1900.

The controller 1930 may include at least one processor. The storage 1940 stores data generated or used by the controller 1930. In particular, the storage 1940 may store the paging zone information and the BS list of the paging zone.

Figure 20:
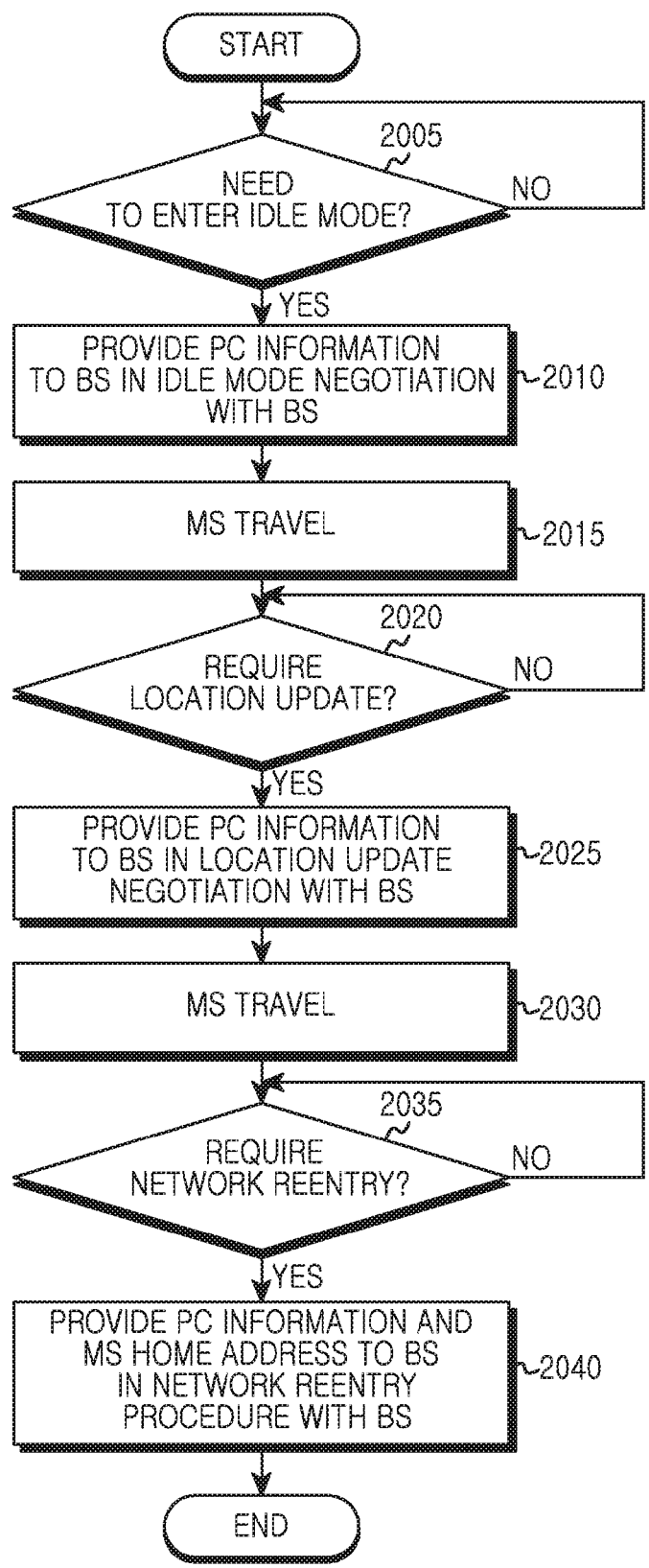
FIG. 20 is a flowchart of MS operations according to an embodiment of the present disclosure.

FIG. 20 is a flowchart of MS operations according to an embodiment of the present disclosure.

Referring to FIG. 20, to enter the idle mode in operation 2005, the MS performs the idle mode negotiation with the BS. In the idle mode negotiation, the MS may provide the PC information to the BS in operation 2010. The PC information may include the identifier of the PC.

When the MS travels in operation 2015 and requires the location update due to the paging zone change in operation 2020, the MS negotiates the location update with the corresponding BS. In the location update negotiation, the MS may provide the PC information to the BS in operation 2025. The PC information may include the identifier of the PC.

When the MS travels in operation 2030 and needs the network reentry in operation 2035, for example, receives the paging advertisement message indicating the received packet destined for the MS, the MS performs the network reentry procedure with the corresponding BS.

In the network reentry procedure with the BS, the MS may provide the PC information and the MS home address to the BS in operation 2040. The PC information may include the identifier of the PC.

As set forth above, in the flat network communication system, an arbitrary small BS operates as the PC for the MS. Thus, the efficient paging control over the MS may be achieved without using the centralized PC.

According to an embodiment of the present disclosure, a method of a BS in a mobile communication system comprises: performing a negotiation procedure for idle mode entry of an MS, with the MS; determining whether to operate as a paging controller for the idle mode MS; detecting a packet destined for the MS; and transmitting a message notifying existence of the packet destined for the MS, to at least one other BS in a paging zone of the BS.

In an embodiment of the present disclosure, the method further comprises: receiving a message notifying network reentry of the MS, from a first BS in the paging zone; generating a tunnel by performing a binding update procedure with the first BS; and forwarding the packet destined for the MS to the first BS through the generated tunnel.

In an embodiment of the present disclosure, the method further comprises: receiving a message indicating a new paging controller of the MS, from a first BS in other paging zone; and transmitting a message comprising context information of the MS, to the first BS in the other paging zone, wherein the context information comprises at least one of home address information and session information of the MS.

According to an embodiment of the present disclosure, a method of a BS in a mobile communication system comprises: receiving a message notifying existence of a packet destined for an MS, from other BS in a paging zone of the BS; broadcasting a paging advertisement message notifying existence of the packet destined for the MS; obtaining information about the other BS operating as a paging controller of the MS by performing a network reentry procedure with the MS; receiving the packet destined for the MS from the other BS operating as the paging controller of the MS; and transmitting the received packet to the MS.

In an embodiment of the present disclosure, the receiving of the packet destined for the MS from the other BS operating as the paging controller of the MS comprises: transmitting a message notifying network reentry of the MS, to the other BS operating as the paging controller of the MS; receiving context information of the MS, from the other BS; generating a tunnel by performing a binding update procedure with the other BS; and receiving the packet destined for the MS from the other BS through the generated tunnel, wherein the context information comprises at least one of home address information and session information of the MS.

According to an embodiment of the present disclosure, a method of a BS in a mobile communication system comprises: receiving information about other BS operating as a paging controller of an MS by performing a location update procedure with the MS; determining whether to operate as a new paging controller of the MS; and transmitting a message indicating that the BS operates as the new paging controller, to the other BS.

In an embodiment of the present disclosure, the method further comprises: receiving context information of the MS, from the other BS; detecting a packet destined for the MS; and transmitting a message notifying existence of the packet destined for the MS, to at least one other BS in a paging zone of the BS.

According to an embodiment of the present disclosure, a method of an MS in a mobile communication system comprises: entering an idle mode by negotiating idle mode entry with a first BS; determining the first BS as a paging controller; receiving an advertisement message from a second BS; based on the received advertisement message, determining whether the MS is in a paging zone of the first BS; and if the MS is in the paging zone of the first BS, performing a network reentry procedure with the second BS.

In an embodiment of the present disclosure, the method further comprises: if the MS is not in the paging zone of the first BS, performing a location update procedure with the second BS; and determining the second BS as a new paging controller.

In an embodiment of the present disclosure, the entering of the idle mode by negotiating the idle mode entry comprises: transmitting a message indicating a previous paging controller of the MS, to the first BS, and the performing of the location update procedure with the second BS comprises: transmitting a message indicating that the first BS is a previous paging controller of the MS, to the second BS.

According to an embodiment of the present disclosure, an apparatus of a BS in a mobile communication system comprises: at least one transceiver configured to transmit and receive signals to and from an MS, and to transmit and receive signals to and from other BS; and at least one processor configured to perform a negotiation procedure for idle mode entry of the MS, with the MS, to determine whether to operate as a paging controller for the mode in the idle mode, to detect a packet destined for the MS, and to transmit a message notifying existence of the packet destined for the MS, to at least one other BS in a paging zone of the BS.

In an embodiment of the present disclosure, the at least one processor controls to receive a message notifying network reentry of the MS, from a first BS in the paging zone, to generate a tunnel by performing a binding update procedure with the first BS, and to forward the packet destined for the MS to the first BS through the generated tunnel.

In an embodiment of the present disclosure, the at least one processor controls to receive a message indicating a new paging controller of the MS, from a first BS in other paging zone, and to transmit a message comprising context information of the MS, to the first BS in the other paging zone, and the context information comprises at least one of home address information and session information of the MS.

According to an embodiment of the present disclosure, an apparatus of a BS in a mobile communication system, comprising: at least one transceiver configured to transmit and receive signals to and from an MS, and to transmit and receive signals to and from other BS; and at least one processor configured to receive a message notifying existence of a packet destined for the MS, from other BS in a paging zone of the BS, to broadcast a paging advertisement message notifying existence of the packet destined for the MS, to obtain information of the other BS operating as a paging controller of the MS by performing a network reentry procedure with the MS, to receive the packet destined for the MS from the other BS operating as the paging controller of the MS, and to transmit the received packet to the MS.

In an embodiment of the present disclosure, the at least one processor controls to transmit a message notifying network reentry of the MS, to the other BS operating as the paging controller of the MS, to receive context information of the MS from the other BS, to generate a tunnel by performing a binding update procedure with the other BS, and to receive the packet destined for the MS from the other BS through the generated tunnel, and the context information comprises at least one of home address information and session information of the MS.

According to an embodiment of the present disclosure, an apparatus of a BS in a mobile communication system, comprising: at least one transceiver configured to transmit and receive signals to and from an MS, and to transmit and receive signals to and from other BS; and at least one processor configured to receive information about other BS operating as a paging controller of the MS by performing a location update procedure with the MS, to determine whether to operate as a new paging controller of the MS, and to transmit a message indicating that the BS operates as the new paging controller, to the other BS.

In an embodiment of the present disclosure, the at least one processor controls to receive context information of the MS from the other BS, to detect a packet destined for the MS, and to transmit a message notifying existence of the packet destined for the MS, to at least one other BS in a paging zone of the BS.

According to an embodiment of the present disclosure, an apparatus of an MS in a mobile communication system, comprising: at least one transceiver configured to transmit and receive signals to and from a BS; and at least one processor for controlling to enter an idle mode by negotiating idle mode entry with a first BS, to determine the first BS as a paging controller, to receive an advertisement message from a second BS, to determine based on the received advertisement message whether the MS is in a paging zone of the first BS, and if the MS is in the paging zone of the first BS, to perform a network reentry procedure with the second BS.

In an embodiment of the present disclosure, if the MS is not in the paging zone of the first BS, the at least one processor performs a location update procedure with the second BS and determines the second BS as a new paging controller.

In an embodiment of the present disclosure, if negotiating the idle mode entry, the at least one processor controls to transmit a message indicating a previous paging controller of the MS, to the first BS, and if performing the location update procedure with the second BS, the at least one processor controls to transmit a message indicating that the first BS is a previous paging controller of the MS, to the second BS.

The methods as described in the claims and/or the specification of various embodiments of the present disclosure may be implemented using hardware, software, or a combination of them.

As for the software, a computer-readable storage medium including one or more programs (software modules) may be provided. One or more programs stored in the computer-readable storage medium may be configured for execution by one or more processors of an electronic device. One or more programs include instructions for controlling the electronic device to execute the methods according to the various embodiments as described in the claims and/or the specification of the present disclosure.

Such a program (software module, software) may be stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the programs may be stored to a memory combining part or all of those recording media. A plurality of memories may be equipped.

The programs may be stored in an attachable storage device accessible via a communication network such as Internet, Intranet, Local Area Network (LAN), Wide LAN (WLAN), or Storage Area Network (SAN), or a communication network by combining these networks. The storage device may access the present electronic device through an external port. A separate storage device may access the present electronic device over a communication network.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for a first base station (BS) in a communication system, the apparatus comprising:
at least one transceiver configured to transmit and receive signals; and
at least one processor coupled to the at least one transceiver and configured to:
performing a location update procedure for a terminal upon the terminal moving from a second paging zone including a second BS to a first paging zone including the first BS, by receiving from the terminal, a first message comprising information regarding the second BS operating as a paging controller of the terminal and transmitting, to the terminal, a second message to respond to the first message,
transmit, to the second BS, a third message indicating that the location update procedure is performed,
receive, from the second BS, a fourth message notifying existence of a packet destined for the terminal, if the packet occurs after the location update procedure,
perform, with the terminal, a network reentry procedure causing the terminal to release an idle mode,
transmit a fifth message informing that the terminal releases the idle mode, generate a tunnel between a third BS that stores the packet in a buffer, receive, from the third BS, the packet, and transmit, to the terminal, the packet, wherein the location update procedure is performed without a signaling for changing the paging controller of the terminal, wherein the second BS is maintained as the paging controller of the terminal regardless of the location update procedure, and wherein the packet is related a session that is established during the terminal is served by the third BS.

2. The apparatus of claim 1, wherein the at least one processor is further configured to transmit, to at least one BS in the first paging zone including the first BS, a sixth message notifying existence of the packet destined for the terminal in response to receiving of the fourth message.

3. The apparatus of claim 1, wherein the at least one processor is further configured to broadcast a paging advertisement message in response to receiving of the fourth message.

4. The apparatus of claim 1, wherein the at least one processor is further configured to generate a tunnel between the first BS and the second BS.

5. The apparatus of claim 1, wherein the communication system comprises a flat network.

6. The apparatus of claim 1, the third message comprising information regarding a plurality of BS in the first paging zone.

* * * * *